US008209732B2

(12) United States Patent
Le et al.

(10) Patent No.: US 8,209,732 B2
(45) Date of Patent: Jun. 26, 2012

(54) ARRANGEMENT AND METHOD FOR MANAGING TESTING AND REPAIR OF SET-TOP BOXES

(75) Inventors: Rong Le, Schenectady, NY (US); Mark Albrecht, Schenectady, NY (US); Luis Aguilar, Ballston Lake, NY (US); Vincente Miranda, Clifton Park, NY (US)

(73) Assignee: Contec LLC, Schenectady, NY (US)

( * ) Notice: Subject to any disclaimer, the term of this patent is extended or adjusted under 35 U.S.C. 154(b) by 974 days.

(21) Appl. No.: 11/904,347

(22) Filed: Sep. 27, 2007

(65) Prior Publication Data

US 2009/0089854 A1 Apr. 2, 2009

(51) Int. Cl.
H04N 7/173 (2011.01)
H04N 17/00 (2006.01)
H04N 17/02 (2006.01)
G06F 19/00 (2011.01)
G01R 35/00 (2006.01)
G01D 3/00 (2006.01)
G01P 21/00 (2006.01)

(52) U.S. Cl. .......................... 725/107; 348/180; 702/108
(58) Field of Classification Search .................. None
See application file for complete search history.

(56) References Cited

U.S. PATENT DOCUMENTS

| 4,475,121 | A * | 10/1984 | Yashiro ................... 725/107 |
| 6,734,898 | B2 | 5/2004 | Zeidler |
| 6,826,512 | B2 * | 11/2004 | Dara-Abrams et al. ...... 702/183 |
| 7,050,090 | B2 | 5/2006 | Brodigan |
| 7,111,318 | B2 * | 9/2006 | Vitale et al. ................ 725/107 |
| 7,664,317 | B1 * | 2/2010 | Sowerby ................... 382/162 |
| 2002/0154219 | A1 * | 10/2002 | Dieterich et al. ........... 348/180 |
| 2003/0086001 | A1 | 5/2003 | Zeidler |
| 2004/0093370 | A1 | 5/2004 | Blair et al. |
| 2005/0102074 | A1 * | 5/2005 | Kolls ........................ 701/29 |
| 2005/0120391 | A1 * | 6/2005 | Haynie et al. .............. 725/135 |
| 2005/0149980 | A1 | 7/2005 | Yun |
| 2005/0183130 | A1 * | 8/2005 | Sadja et al. ................ 725/107 |
| 2006/0025092 | A1 | 2/2006 | Sanders et al. |
| 2008/0034385 | A1 * | 2/2008 | Cruickshank et al. ...... 725/14 |
| 2008/0134251 | A1 * | 6/2008 | Blinnikka ................... 725/58 |

OTHER PUBLICATIONS

International Search Report for PCT Appln. No. PCT/US07/20833 (Form PCT/ISA/210 dated May 19, 2008.
Form PCT/ISA/237 (Written Opinion of the International Searching Authority) for PCT Appln. No. PCT/US07/20833 dated May 19, 2008. Communication dated Jan. 5, 2010 issued by the Canadian Patent Office in related Canadian Patent Application No. 2,613,381 (2 pages).
Communication dated Jun. 28, 2010 issued by the Canadian Patent Office in related Canadian Patent Application Serial No. 2,613,381 (2 pages).
Communication dated Aug. 17, 2010 issued by the Canadian Patent Office in related Canadian Patent Application Serial No. 2,613,381 (2 pages).

\* cited by examiner

*Primary Examiner* — Mark D Featherstone
(74) *Attorney, Agent, or Firm* — Robert P. Michal; Lucas & Mercanti, LLP

(57) ABSTRACT

Arrangement and method for managing set-top boxes used by customers of a content service provider includes at least one automated tester each arranged to couple to set-top boxes and subject each set-top box to a series of automated tests to determine whether each set-top box is functioning properly or requires subsequent repair, and a processor unit coupled to each automated tester for receiving test results therefrom and monitoring testing of set-top boxes via the automated tester(s). Each automated tester is located at a testing facility maintained by the content service provider. A database stores the test results from the automated tester(s) and enables generation of customized reports about the set-top boxes tested by the automated tester(s). A billing system is coupled to each automated tester and to the processor unit and coordinates invoicing for testing performed by the automated tester(s) and repair of set-top boxes at a repair facility.

25 Claims, 15 Drawing Sheets

ARRANGEMENT AND METHOD FOR MANAGING TESTING AND REPAIR OF SET-TOP BOXES

FIELD OF THE INVENTION

The present invention relates generally to an arrangement and method for managing diagnostic testing and repair of set-top boxes used for providing programming content to televisions, and more particularly to an arrangement and method which enable diagnostic testing of a plurality of television set-top boxes for any one of a number of different operational errors, and coordinates repair of defective set-top boxes.

BACKGROUND OF THE INVENTION

Set-top boxes are a known electronic component which receives television programming signals from a source thereof, such as a cable, fiber-optic, DSL, BPL or satellite, and controls one or more televisions connected thereto to display the received programming. The discussion below focuses on set-top boxes which receive content provided by a content service provider.

Content service providers usually lease or sell set-top boxes to consumers to be used with the provided video content service. The content service providers typically assume an obligation to provide a functional set-top box to the customer and fix any malfunctions detected by the customer. When notified that a customer's set-top box is malfunctioning, the content service provider usually exchanges the malfunctioning set-top box for a functional set-top box.

The set-top boxes indicated by the customers to be malfunctioning are gathered by the content service provider at a designated location such as a warehouse or other storage facility. At the warehouse, to determine whether the set-top boxes are actually malfunctioning, the allegedly malfunctioning set-top boxes are typically subjected to a few basic, minimal tests, without any consistency in the nature of the tests. Thus, for example, a test operator may analyze each set-top box to determine whether the set-top box is superficially functioning correctly or not. This entails, among other things, connecting the set-top box to video and audio output devices, checking for certain channels and a guide screen, manually initiating tests and visually monitoring the video output of the screen and audibly monitoring the audio output. Other tests may also be performed by the test operator to ascertain the basic functionality of the set-top box or the existence of a fault in the set-top box or failure thereof.

Initiation and running of the tests involves use of user-prompted screens displayed on the video output device connected to the set-top box, which are problematic as the test operator may err in the prompts and fail to locate a problem with the set-top box. For example, testing analog or digital video output of the set-top box is conducted by prompting the test operator to view a channel on the video output device for about five seconds and enter a video quality pass notation, or not. Other tests also require the test operator to enter a quality pass notation. It has been found that test operators often simply enter the pass notation for all the various tests in order to expedite the diagnostic testing process.

Furthermore, some tests are hard to verify, such as a test for verifying Security ID's which requires careful examination of sometimes lengthy character strings. Often, a single erroneous character in a long string will be difficult to verify, possibly due to similarities between characters used in the Security ID's, such as "O" and "0".

Typical results of the testing of set-top boxes may indicate the presence of each set-top box in one or more of the following non-exclusive categories: No problem found (NPF); Security ID problems; unable to authorize the set-top box for program reception; RF level; Error status/purchases; Video/Audio adjustment; Analog & digital channel failures; AC outlet problems; and return path tests.

If a set-top box fails this initial testing stage, it is sent for further testing to a dedicated testing and repair facility. However, if a set-top box has an inconsistent Security ID and serial number, it generally cannot be sent to the testing and repair facility and is left at the warehouse to await manual correction to the Security ID or serial number of the set-top box by the content service provider personnel, which unfortunately can result in long time delays from when the problem is diagnosed to when it actually gets resolved.

Although there is preferably some basic testing of the set-top boxes at the warehouse by the content service providers, as described above, it is not unheard of that prior to sending set-top boxes to the testing and repair facility, the content service providers do not ascertain whether the set-boxes are indeed malfunctioning, but rather and unfortunately, rely on the customer's indication of a malfunction in the set-top box.

Additionally, errors made in diagnosing a set-top box as defective are also made in reverse of diagnosing a set-top box as functional when it is in deed defective. This can result in additional handling and truck rolls to retrieve the defective unit from the field, along with customer dissatisfaction of having a defective unit deployed in their home.

The foregoing testing process can lead to significant delays in the turn-around time between receipt of an allegedly malfunctioning set-top box from a customer and return of a functional set-top box to the deployment queue for deployment to a customer. Among other things, when a unit is categorized defective, it may be kept at the content service provider's warehouse in preparation for shipping to the testing and repair facility. Once at the testing and repair facility, the set-top boxes are subjected to thorough diagnostic checks which determine whether the set-top box has been correctly diagnosed as a set-top box with problems, i.e., whether the reported effect is the correct diagnosis. If so, the set-top box will be serviced and processed for shipment to the content service provider's warehouse, where it will be re-entered into an inventory tracking system and processed until it is delivered to a customer. However, prior to actually being delivered to a customer, there may be an error in the processing which will result in the set-top box being returned to the testing and repair facility. As a result of the foregoing activity, a properly functioning set-top box may be removed from deployment for one month or longer.

It would be desirable to provide a testing process for set-top boxes which reduces the time for testing set-top boxes in order to maximize the potential use and deployment of the set-top boxes. Moreover, it would be desirable to expedite the analysis of the functionality of set-top boxes, once indicated by customers as malfunctioning, in order to shorten testing and repair times and return of functioning set-top boxes to the content service provider for deployment to customers. The systematic order and regimented control of following predetermined test sequences in logical order allows for the reduction of test times and the repeatability of diagnosis to occur. Lastly, with such system in place, spare part ordering for cosmetic parts and replacement accessories (i.e. remote control units, AC power cords, and cables) can be streamlined and delivery expedited to the point of use in the content providers testing facility.

OBJECTS AND SUMMARY OF THE INVENTION

A general object of the present invention is to provide an arrangement and method for managing diagnostic testing of television set-top boxes.

In order to achieve this object and others, an arrangement for managing set-top boxes used by customers of a content service provider in accordance with the invention includes at least one automated tester each arranged to couple to at least one set-top box and subject each set-top box to a series of automated tests to determine whether each set-top box is functioning properly or requires repair, and a processor unit coupled to each automated tester for receiving test results therefrom and monitoring testing of set-top boxes via the automated tester(s).

Each automated tester is located at a testing facility maintained by the content service provider. When multiple automated testers are provided, located at the same or different testing facilities, the processor unit may be coupled to all of them, e.g., via one or more networks.

In one embodiment, a database is coupled to the processor unit for storing the test results from the automated tester(s). An interface to the database is provided to enable generation of customized reports about the set-top boxes tested by the automated tester(s).

Different categorizations of the set-top boxes as a result of the testing are envisioned. In one categorization, each automated tester categorizes a tested set-top box as one in acceptable working order, one having a problem that can be resolved at the testing facility or one having a problem that requires shipment to a repair facility. Each set-top box categorized as being in acceptable working order can be redeployed. Each set-top box categorized as having a problem that can be resolved at the testing facility is repaired at the site of the automated tester. Each set-top box categorized as having a problem requiring shipment to a repair facility is shipped to the repair facility.

A billing system is coupled to each automated tester and to the processor unit and coordinates invoicing for testing performed by the automated tester(s) and/or repair of set-top boxes at the repair facility, along with tracking inventory movement.

The processor unit may coordinate shipment of set-top boxes determined to require repair to a repair facility, repair of these set-top boxes at the repair facility and shipment of repaired set-top boxes to the testing facility. The processor unit may include computer programs for performing a plurality of diagnostic tests on each set-top box and providing an indication of failure of a specific one of the diagnostic tests. The processor unit can thus keep each set-top box determined to be functioning properly at the testing facility for redeployment to customers.

Each automated tester may include one or more optical scanners for scanning a screen of a video output device, and a computer program which recognizes optical characters on the screen and analyzes the recognized optical characters.

Another arrangement for managing set-top boxes used by customers of a content service provider includes a testing system for testing set-top boxes and which is arranged to subject each set-top box to a series of automated tests to determine whether each set-top box is functioning properly or requires repair, and a processor system coupled to the testing system for receiving test results about set-top boxes from the testing system and coordinating service of set-top boxes determined to require repair. The testing system is located at a testing facility maintained by the content service provider. A billing system may be coupled to the processor system for coordinating invoicing for testing performed by the testing system and repair of set-top boxes. A data storage system may be provided for storing test results from the testing system. The data storage system may be accessible to enable generation of customized reports about operability of the set-top boxes.

A method for managing set-top boxes used by customers of a content service provider in accordance with the invention includes receiving set-top boxes at a testing facility including any set-top boxes indicated by customers as malfunctioning, coupling each set-top box to an automated tester located at the testing facility, and subjecting each set-top box to a series of automated tests by means of the automated tester to identify whether each set-top box is in acceptable working order, has a problem that can be resolved at the testing facility or has a problem that requires shipment to a repair facility. Each set-top box identified as being in acceptable working order is deemed redeployable without shipping the set-top box to the repair facility. Each set-top box identified as having a problem that can be resolved at the testing facility is resolved at the testing facility. Each set-top box that has a problem requiring shipment to a repair facility is shipped to the repair facility, repaired at the repair facility and then shipped back to the testing facility for redeployment to customers.

In one embodiment, the testing facility at which the set-top boxes indicated by customers as malfunctioning are received is a warehouse maintained by the content service provider. As such, set-top boxes identified as being in acceptable working order by the automated tester are stored at this warehouse for subsequent redeployment, thereby avoiding shipment of the set-top boxes to the repair facility.

The automated testers can be constructed and programmed to perform various different automated diagnostic tests. The automated tester could be programmed to first identify the model and make of the set-top box and then run a set of automated diagnostic tests specific to the determined model and make of the set-top box.

In one embodiment, the automated tests include a test for checking a Security ID and serial number of the set-top box. In this case, a problem with correspondence between a Security ID or serial number obtained from the set-top box and a Security ID or serial number provided to the automated tester from the content service providers internal computer system is considered a problem resolvable at the testing facility, thereby avoiding shipment of the set-top box to the repair facility.

When a set-top box is deemed to require repair at the repair facility, the repair facility may be notified to enable the repair facility to order parts for repairing the set-top box. Optimally, delivery of parts for repairing the set-top box is coordinated with delivery of the set-top box at the repair facility. The repair facility and the testing facility, i.e., the site at which the automated tester is situated, may be linked via one or more networks.

Information derived from the automated tests performed by the automated tester may be stored in a database. Personnel of the content service provider may be allowed access to the database to enable generation of customized reports about the operability of set-top boxes.

The testing to which the set-top boxes are subjected may be monitored by a main server, which also monitors the repair status of the set-top boxes, and invoicing for testing and repair of the set-top boxes coordinated via a billing system linked to the testing facility and the repair facility.

When multiple automated testers are provided, either at the same or different testing facilities, they may all be coupled to a single control processor which receives test results from all of the automated testers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
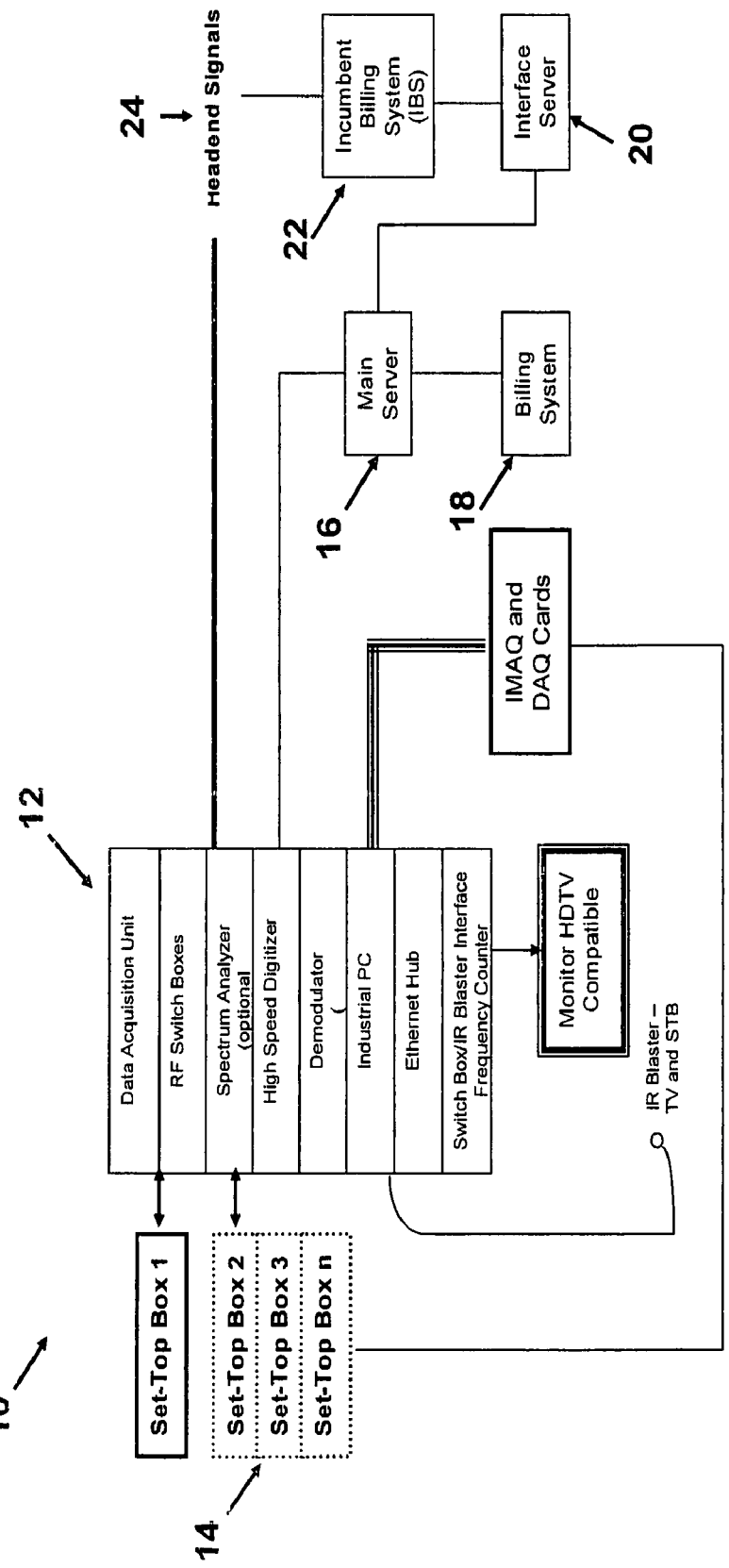
FIG. 1 is a schematic showing an arrangement for testing set-top boxes in accordance with the invention.

Referring to the accompanying drawings wherein the same reference numerals refer to the same or similar elements, FIG. 1 shows an arrangement for testing set-top boxes in accordance with the invention designated generally as 10. Arrangement 10 includes one or more remote location screening (RLS) tester 12, each of which is operatively coupled to one or more set-top boxes 14 for testing and diagnosing the set-top boxes 14. In a preferred embodiment, each RLS tester 12 is provided with sufficient electronic components and coupling hardware to enable simultaneous testing of multiple set-top boxes 14.

For the sake of simplicity, the description below will relate generally to cable television set-top boxes, but it is understood that all types of set-top boxes interposed between a source of content programming and a television can be used in the invention. Even more generally, the invention would be applicable to an electronic component interposed between a source of audio and/or visual programming and a device which is capable of processing the audio and/or visual programming.

The RLS tester 12 is designed for installation at a content service provider's warehouse or other facility where set-top boxes, which customers believe to be malfunctioning, are gathered. The RLS tester 12 includes a processor and associated electronic or computer hardware and software to enable the processor to communicate with the set-top boxes 14 and run one or more computer programs designed to perform diagnostic testing of the set-top boxes 14.

The RLS tester 12 can be programmed to run software diagnostic tests for specific models and makes of set-top boxes 14. To this end, either the processor is coupled to memory wherein computer programs for the different models and makes are stored or the processor is coupled to a network to enable computer programs to be provided to the processor upon a determination of the need to test a specific model and make of set-top box from a centralized server. In the latter case, the processor would couple to the set-top box 14, determine its model and make and then send a request over the network to a storage facility wherein the computer programs are stored to forward a program for the determined model and make of set-top box 14. This expands the potential testing abilities of the RLS tester 12 while minimizing the amount of programs it needs to have in its memory.

The RLS tester 12 may be resident on a personal computer or other type of computer. Preferably, the computer would be networked through TCP/IP protocol and utilize HTTPS protocol for security reasons, although other protocols could be used successfully to achieve the same end results.

For overall monitoring of the arrangement 10 including one or more RLS testers 12, there is a main server 16 which is coupled through the network to all of the RLS testers 12. Each RLS tester 12 may be resident at a specific content service provider's facility with all of the RLS testers 12 being coupled to the single main server 16 managed by, and optionally located at, a central repair and testing facility. The server 16 could be programmed to provide the computer programs for testing the different models and makes of set-top boxes to the RLS testers 12, upon request by the RLS tester 12 or as part of a program update. The RLS testers 12 may also function as a stand alone entity with no programs being supplied for testing of the set-top boxes 14 from the main server 16.

The main server 16 may run on a JAVA-based application. The main server 16 preferably includes a master remote location screening database which filters, i.e., collects, validates and retains, data sent to the main server 16 by the RLS testers 12 through the network. The database will retain a copy of all of the information obtained during testing of set-top boxes 14 by each RLS tester 12. The manner in which this information is retained by the database can be any manner known to those skilled in the art, and may be an identification of each set-top box 14 with all information derived through testing of that set-top box 14. This information is preferably time stamped to enable tracking of testing of the set-top boxes 14 over time.

The main server 16 includes one or more computer programs which process the information being provided by the RLS testers 12, e.g., sorts or categorizes the information, and stores this information at the main server 16 and/or at another location linked through a network to the main server 16. Customized reports about RLS testers 12, groups of set-top boxes 14, particular models of set-top boxes 14, and particular makes of set-top boxes 14, can be generated by accessing the information being processed by the main server 16.

The customized reports may be generated and tailored to the needs of the specific management team, for viewing and data collection on the history of the set-top boxes, e.g., particular models and/or makes of set-top boxes. Moreover, the customized reports about the functioning of the warehouses in which the set-top boxes 14 are stored, and in which the RLS testers 12 are located, can be generated.

A billing system 18 is preferably coupled to the main server 16 and manages fees for using the RLS testers 12. This may involve invoicing the content service providers for testing the set-top boxes 14 and repairing malfunctioning set-top boxes 14, possibly also including shipping charges for shipping set-top boxes 14 from one location to another to be repaired. The billing system 18 can also include a database for retaining information about set-top boxes 14 that are being sent from the warehouses to a repair facility.

The connection between the billing system 18 and the main server 16 may be done through one or more networks, or the billing system 18 could be resident at the main server 16, i.e., a part thereof. Generally, the network or networks connecting the RLS testers 12 and the main server 16, and the billing system 18 when separate from the main server 16, may be any network known to those skilled in the art, and created using known network formation techniques and platforms. Each such network would likely include routers and servers, both application servers and database servers.

Connected to the main server 16 is an interface server 20 that connects to the content service providers incumbent billing system 22 that is used to track and manage inventory of the set-top boxes 14. The incumbent billing system 22 interfaces with the content service providers headend signals 24 which in turn through the network, authorize set-top boxes 14 for reception of content and advanced services provided by the content service provider for a fee. The connection between the main server 16 and the interface server 20 may be done through one or more networks, or the interface sever 20 could be resident at the main server 16, i.e., a part thereof and the network or networks connecting main server 16, and the interface server 20 when separate from the main server 16, may be any network known to those skilled in the art, and created using known network formation techniques and platforms. Each such network would likely include routers and servers, both application servers and database servers.

There are numerous advantages of placing the RLS tester 12 at the warehouse or other facility of the content service provider at which set-top boxes 14 are gathered after being returned by customers on the grounds of the presence of a malfunction.

First, since the RLS tester 12 provides for automated testing of set-top boxes 14, it can process numerous tests faster, simultaneously and more accurately than test operators performing manual tests. It is envisioned that the RLS tester 12 can process set-top boxes 14 at least three times faster than the manual process described above, and at an greater accuracy level. In addition, the RLS tester 12 is preferably programmed to conduct more tests than possible by means of the manual process. Moreover, by reducing involvement of testing personnel both with respect to performing the tests and making decisions about the test results, the testing process can reliably and repeatedly be performed while preventing diagnostic errors, in contrast to a situation where a test operator may take a short cut during testing and eliminate one or more tests.

Second, since the RLS tester 12 provides an immediate indication when a set-top box 14 passes testing, the set-top box can be immediately processed for redeployment to a customer. Under the manual process, a set-top box categorized defective and later categorized as "No Problem Found" (NPF) at the repair facility would have to be sent from the content service provider's warehouse to the repair facility and then back to the warehouse, all of which would decrease the deployment time of the set-top box 14, and moreover incur shipping charges. Thus, the ability of the RLS tester 12 to immediately diagnose a properly functioning set-top box 14, even though indicated by a customer as being potentially malfunctioning, results in savings of money and improves deployment of the set-top box 14.

Third, since the RLS tester 12 provides an immediate categorization of the result of the testing, i.e., an indication of the problem with the set-top box 14, it now becomes possible to fix certain problems at the warehouse dispensing with the need to ship the set-top boxes 14 to the repair facility. Thus, some of the problems with set-top boxes 14 diagnosed by the RLS tester 12 can be readily fixed at the warehouse or other testing site so that the set-top box 14 would not need to be shipped to the repair facility. For example, Security ID problems and Video/Audio adjustment problems can typically be fixed at the warehouse or other testing site.

Security ID problems and Serial Number mismatch issues can be corrected more accurately and efficiently, once they are identified to the testing personnel upon testing via the RLS tester 12. For example, at the testing site, the RLS tester 12 can be connected to one or more printers which will print out the correct Serial Number, and direct the test operator to scan the number for entry into their billing system. Such mismatched Security ID or serial numbers could also arise when there is a difference between these addresses or numbers in the main server 16 or other system controller, the incumbent billing system 22, and possibly other hardware interfacing with the set-top boxes 14. These type of mismatch issues could conceivably be resolved without manual intervention.

Additional problems or issues with the set-top boxes 14 which could be resolved at the site at which the RLS tester 12 is located include the presence of a stranded purchase in a set-top box 14, i.e., a pay-per-view (PPV) program purchased but not yet processed for payment. The RLS tester 12 would identify such a purchase and notify the test operator to collect the PPV program prior to shipping the set-top box 14 to the repair facility, if it has been determined to require shipment to the repair facility, or prior to redeploying the set-top box 14, if it has been determined to be a functional set-top box 14 and thus scheduled for deployment.

Yet another resolvable issue is when a set-top box 14 is determined to be capable of receiving certain services yet authorization to receive the services was not properly granted. The RLS tester 12 can be programmed to perform a test to compare the authorized services for each set-top box 14 with the actual services capable of being performed or provided by the set-top box 14 and any variations noted for forwarding to the content service provider for action.

Fourth, set-top boxes 14 which are diagnosed with a problem that cannot be resolved at the testing site and need to be shipped to a repair facility for repair will be flagged both at the testing site and also at the repair facility via a network connection between the RLS tester 12 and the main server 16, or other server managing the repair facility. As such, the repair facility is provided with an expected number of set-top boxes 14 being shipped for service, and preferably also the type of repairs required for the set-top boxes. The main server 16 can thus direct appropriate parts to the repair facility and coordinate the shipping of the parts with the shipping of the set-top boxes 14. Moreover, the main server 16 can be programmed to estimate shipment dates for the set-top boxes 14 from the site of each RLS tester 12, the time for repair of the set-top boxes 14, the shipment dates for return of the set-top boxes 14 from the repair facility to the RLS tester sites and the estimated cost for repair of the set-top boxes 14 and provide this information to the content service providers.

Fifth, in addition to the improvement of the speed, accuracy, and the convenience that the RLS tester 12 brings to testing set-top boxes 14 at the warehouse or other storage facility of the cable television service provider, the testing of set-top boxes 14 by the RLS testers 12 enables information about the set-top boxes 14 to be accumulated and accessed by the warehouse managers. The warehouse managers previously did not have access to information derived from testing of the set-top boxes 14.

All of the set-top boxes 14 that are tested by the RLS tester 12 will be logged for every test and the testing history of each set-top box 14 maintained at the discretion of the operating site, not less than six (6) months, and up through the life of the set-top box 14. The warehouse manager can be provided with means to access this data, e.g., through a web service portion of the arrangement 10 which allows secure web access to the main server 16, or database coupled thereto, which stores the information. This provides a way for the warehouse managers to be able to access and customize reports which can be tailored to their needs.

The reports could contain information relating but not limited to failure rates, and failure symptoms on the set-top boxes 14 being used by the content service provider. It also provides a convenient way for the manager to keep track of the volume, status, and most frequently encountered failure modes of their inventory of set-top boxes 14. Further, it allows the managers to do their data mining and helps them in the decision making process when procuring new product, planning for operating budgets and assessing personnel needs for processing and preparing set-top boxes 14 for use.

Additional benefits of accumulating data about the set-top boxes 14 being obtained during testing by the RLS testers 12 include the ability to track the set-top boxes 14 for their entire life cycle, across either a local or global environment, which improves management of the set-top boxes 14 regardless of their location.

A comprehensive database about the set-top boxes 14 can be constantly updated as set-top boxes 14 are tested by RLS testers 12. Moreover, it becomes possible to immediately locate any set-top box 14, i.e., the last known location of the set-top box 14, using a unique identifier for each set-top box 14 such as its serial number and when the set-top box 14 is being repaired, it is possible to determine the stage of repair of the set-top box 14. This may be a determination that the set-top box 14 is at the warehouse or other testing site awaiting testing, undergoing testing, at the warehouse or testing site awaiting shipment to the repair facility, in shipment to the repair facility, at the repair facility awaiting repair, undergoing repair, at the repair facility awaiting shipment back to the warehouse or testing site, in shipment to the warehouse or testing site, at the warehouse or testing site awaiting deployment, in shipment to a customer, or at a customer's premises. Data about the set-top box 14 between the testing via the RLS tester 12 and the receipt by the warehouse after repair, i.e., the duration of the repair process, can be monitored.

By enabling tracking of each set-top box 14, it would provide for better inventory tracking and time-stamping of locations passed through, thus reducing the potential of missing or lost set-top boxes 14.

Moreover, warehouse productivity and process management would be improved by the tracking of set-top boxes 14. This could be facilitated by the use of optical scanners, such as a bar code scanner, which would be used to scan the serial number of the set-top box 14 as it is being handled in the warehouse or other testing site. Such scanners would communicate with the main server 16.

There are several technical benefits arising from the construction of the RLS tester 12, depending on its configuration. The RLS tester 12 can be constructed to provide an advanced optical character recognition (OCR) analysis which allows for accurate reading from the diagnostic menu of the set-top box 14 as part of the tests. This could involve positioning a device to view the video output device or interface with the television to obtain the content of the diagnostic menu being displayed.

The RLS tester 12 can be programmed to identify whether the security address of the set-top box 14 is correctly loaded and matches with the label and information at the billing system 18. If not, this could be indicative of a security breach, i.e., unauthorized use of the set-top box 14.

The RLS tester 12 could also be programmed to check purchase status of the set-top box 14 to determine whether the set-top box 14 has retained purchase records in its memory.

The RLS tester 12 can also be programmed to perform a model and platform code test to identify whether the code and model are properly registered on the main server 16, the billing system 18, or another customer service processor or system. This may involve connecting an optical scanner, such as a bar code reader, to the RLS tester 12 and scanning bar codes placed on the set-top boxes 14 as supplied from the manufacturer of the original equipment. Further, the RLS tester 12 can be programmed to identify set-top boxes 14 which have mismatched software revision or model types within the main server 16, incumbent billing system 18 or other hardware interfacing with the set-top boxes 14.

The RLS tester 12 could also be programmed to test the functionality of the keys of the set-top boxes 14, i.e., a key press test.

Other programs in the RLS tester 12 can be designed to test digital picture quality and the presence of an analog picture.

The RLS tester 12 could also be programmed to determine compliance with standards set by the OEMs of the set-top boxes 14. To this end, the RLS tester 12 could be programmed to guarantee a verification process for picture quality recommended by the OEM's.

The RLS tester 12 could also be programmed to check the warranty status of the set-top box 14 if, as a result of the testing, it is necessary to send the set-top box 14 to a repair facility. This would be useful for several reasons including determining the party responsible for payment for the repair and determining which repair facility performs repairs under the warranty.

Figure 2:
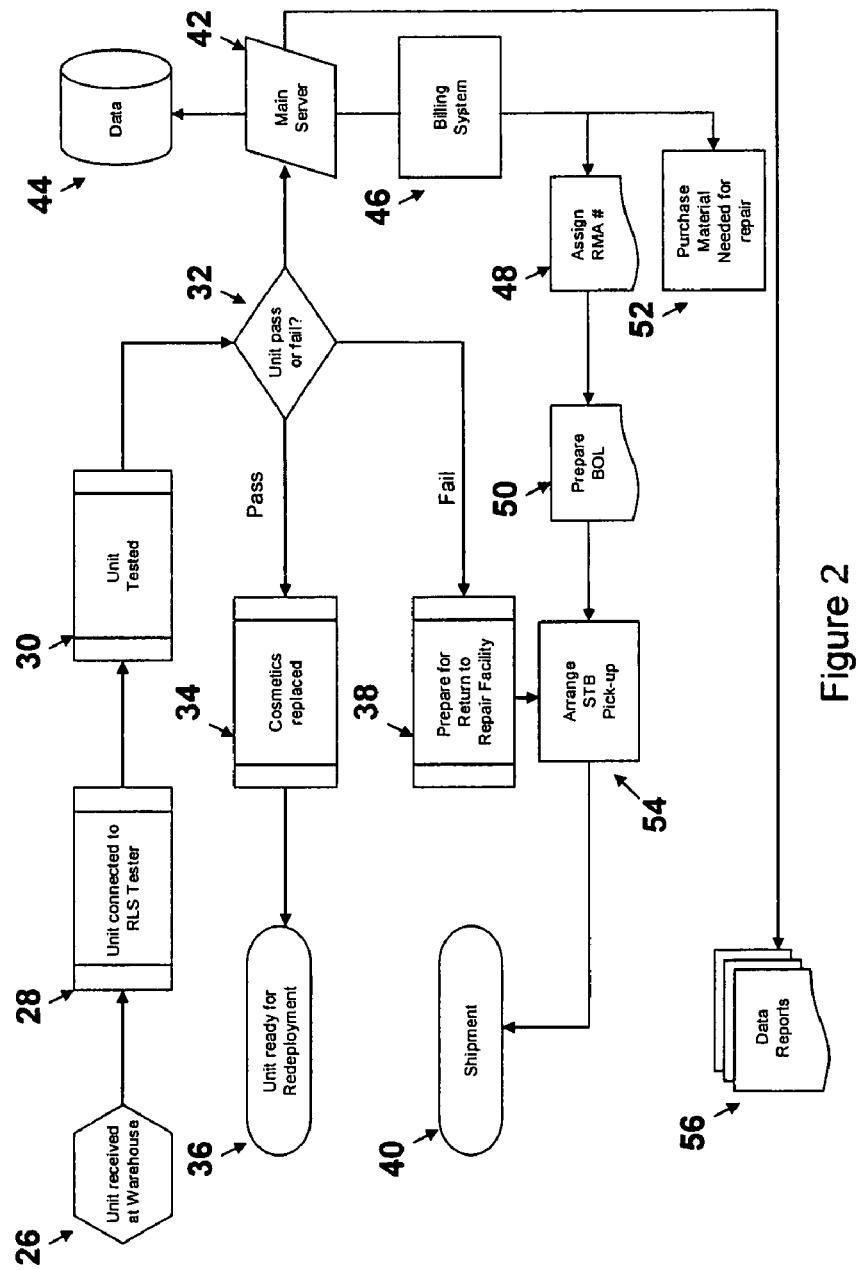
FIG. 2 is a flow chart of the process by which a set-top box is tested and scheduled for repair if needed in accordance with the invention.

Referring now to FIG. 2, a flow chart of an exemplifying process by which a set-top box 14 is tested and scheduled for repair if needed is shown. The initial step 26 is to receive the set-top box 14 at a warehouse or other facility at which the content service provider gathers set-top boxes 14 returned from customers which have been indicated as malfunctioning by the customers. Then in step 28, each set-top box 14 is connected to the RLS tester 12 and the set-top box 14 is tested at step 30. A determination is made at 32 if the set-top box 14 passed or failed the test. If the set-top box 14 passes the test, its cosmetics are replaced at 34, i.e., it is cleaned and inspected for damaged parts and such damaged parts are replaced, and it is then considered ready for re-deployment to a customer at 36. When the set-top box 14 fails a test, it is prepared for shipment to a central facility for repair of set-top boxes 14 at 38 and then shipped at 40.

After the determination is made at 32 as to whether the set-top box 14 passed or failed the test, the main server 16 is notified by the RLS tester 12 that the set-top box 14 has passed or failed the test, at 42, preferably with particular results of the test and data about the set-top box 14. This information may be directed to a data storage facility at 44, and also to the billing system 18, at 46, to coordinate payment for the testing and possible repair, which may vary depending on the number and type of tests performed on the set-top box 14 and the repairs needed.

If the set-top box 14 has failed the test, a Returned Material Authorization (RMA) is assigned at 48, a bill of lading (BOL) is prepared at 50, material for the repair is purchased at 52 and arrangements are made to made to pick up the failed set-top box 14 at 54 and ship the malfunctioning set-top box 14 to the repair facility, at 40.

Customized reports, of the nature described above, may be prepared, at 56, upon accessing the main server 16.

Figure 3:
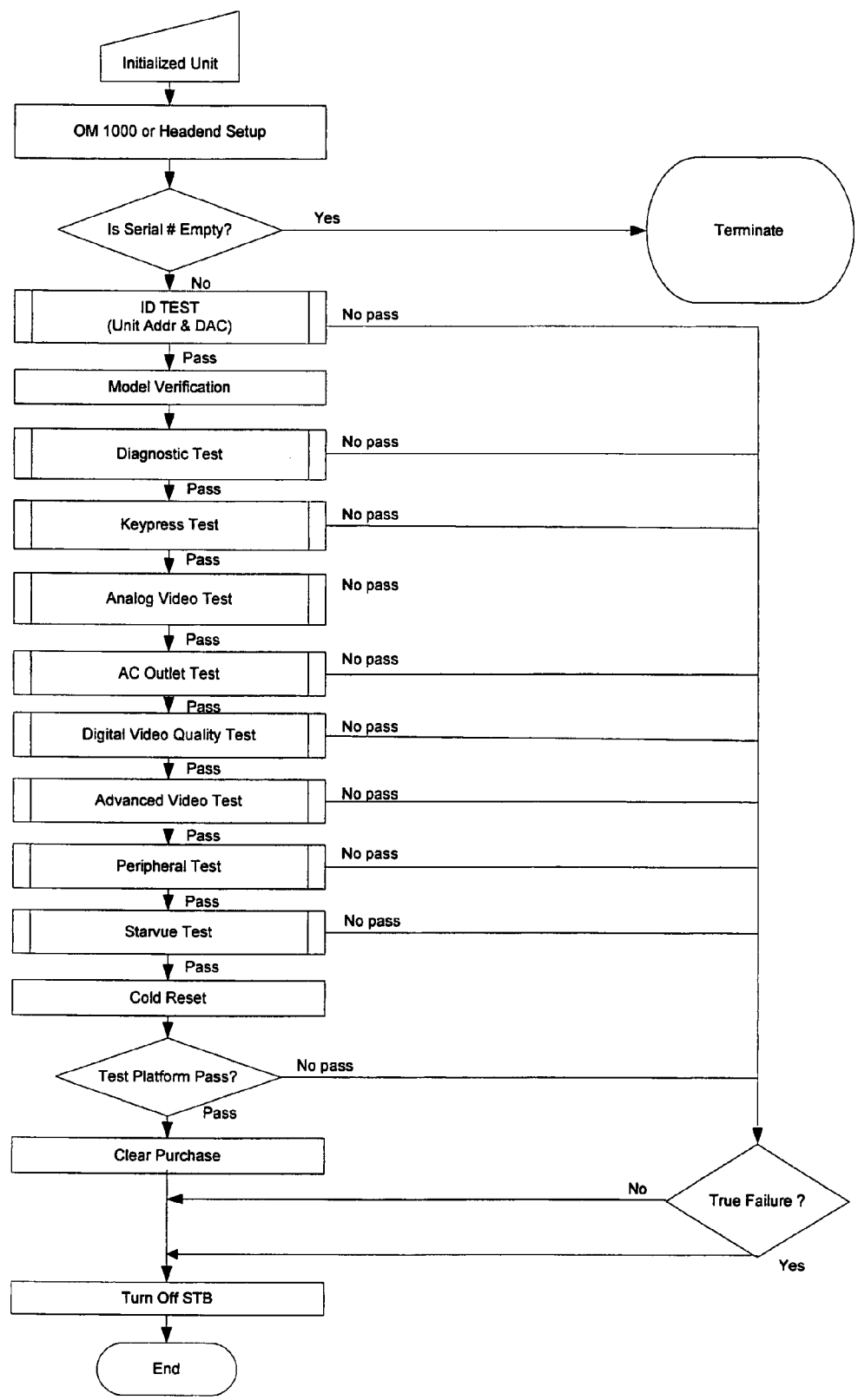
FIG. 3 is a flow chart of a process for testing a set-top box in accordance with the invention.
Figure 4:
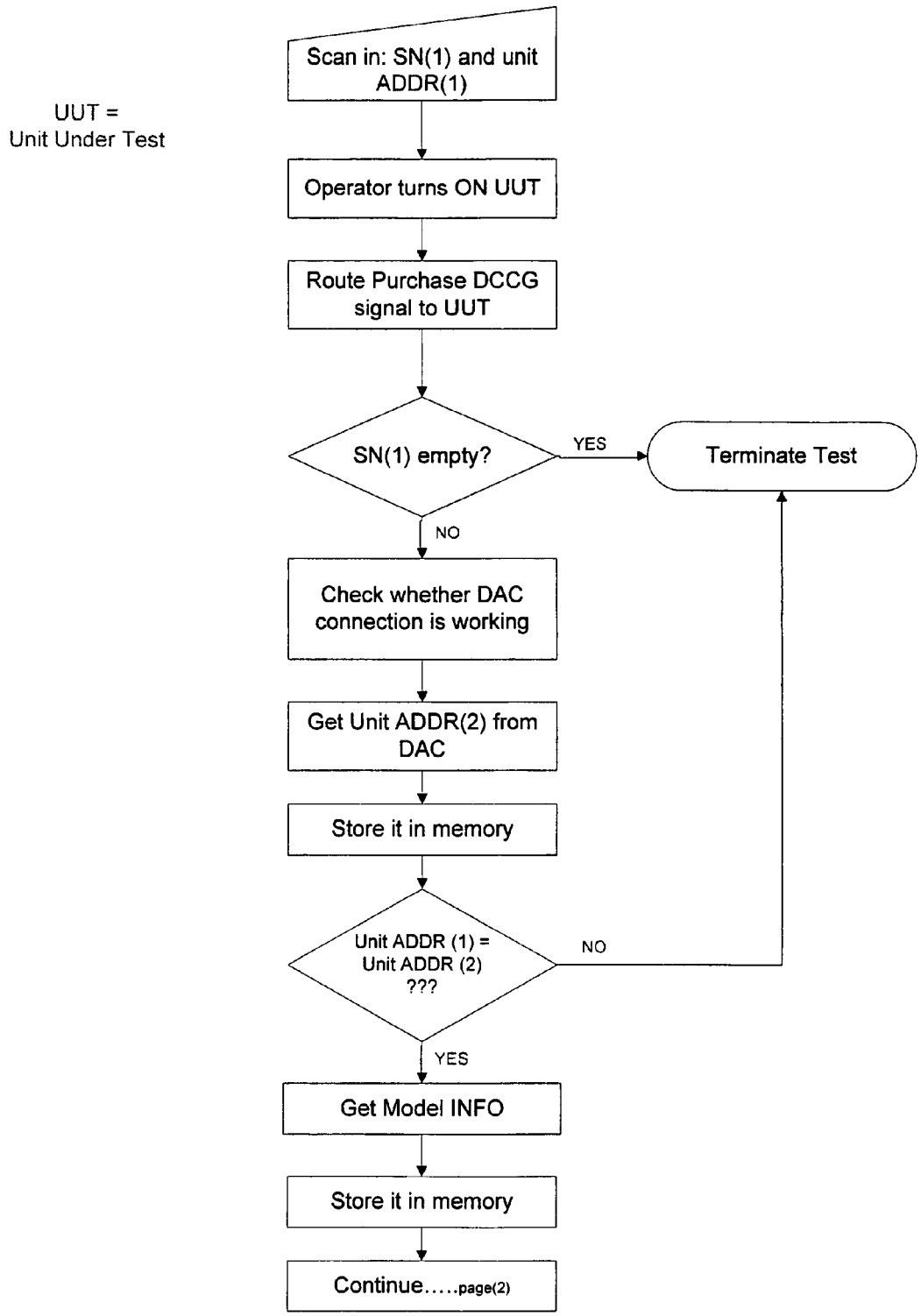
FIGS. 4-15 are flow charts of different stages of a process for testing set-top boxes in accordance with the invention.
Figure 5:
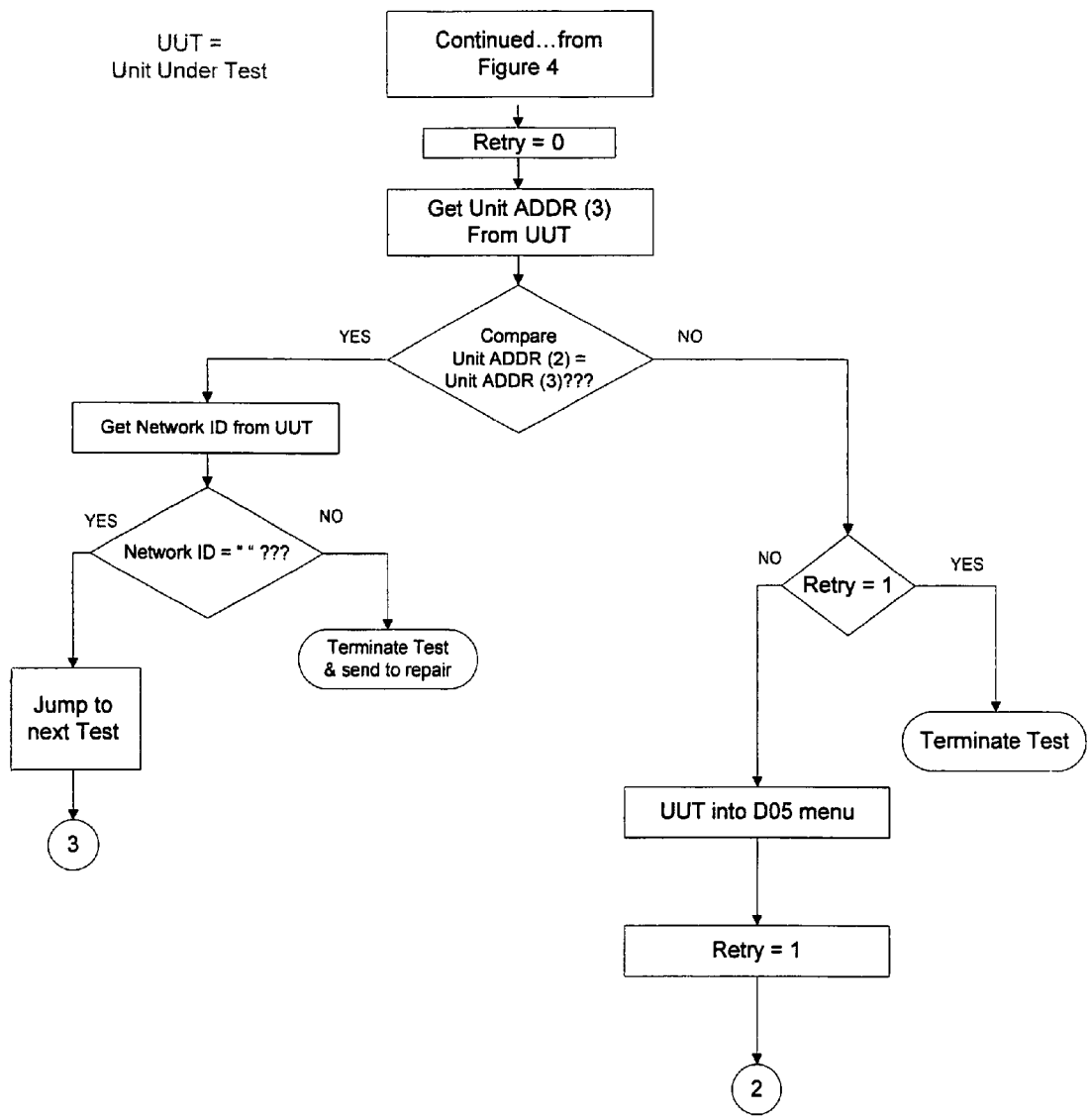

Referring now to FIGS. 3-15, as mentioned above, the RLS tester 12 can be constructed and programmed to perform a number of tests on each set-top box 14 and some of these tests are identified in FIG. 3 and flow charts thereof shown in FIGS. 4-15. Additional tests are not identified in FIG. 3 but can be performed, and are therefore included in the following description of the testing process. It should be understood that the specific test or group or tests being performed can be individually determined for each set-top box 14, for each RLS tester 12, for each content service provider, etc., and can vary as desired. Moreover, the order of tests shown in FIG. 3 is not limiting and when the identified tests are performed, they can be performed in a different order as desired.

After initializing the set-top box 14, a determination is made whether the serial number is empty and if so, the testing process is terminated. An initial test may be an identification or Unit ID test which is designed to eliminate or decrease the number of NPF set-top boxes 14 that are sent for repair to the repair facility. This test is also useful to help the content service provider identify discrepancies between data about set-top boxes being maintained by the billing system 18 and the main server 16.

If the set-top box 14 passes the Unit ID test, its model number is verified and a diagnostic test is performed. The diagnostic test is designed to tune the set-top box 14 to a diagnostic screen and check for various conditions to determine the state of the set-top box 14.

Among other things, the diagnostic test may include, but not limited to, an error code check, a purchases check, a model number check, a Security ID check, a firmware version check and a return frequency level check. The error code check will look for existing error codes apparent on the set-top box 14 which would be indicative of pre-existing problems with the set-top box 14. The purchases check looks for pre-existing purchases, e.g., PPV programs, which would be collected for billing purposes or for verifying billing for such programs. The model number check involves obtaining the model number that appears on the diagnostic screen, via an OCR process performed using an associated video input device, and comparing this number to the number logged into the RLS tester 12 upon initial scan of the set-top box 14 for testing by the RLS tester 12. The Security ID check would be repetitive to or part of the Unit ID test. The firmware versions check would be a check to determine whether the firmware or operating system of the set-top box 14, as obtained for example through OCR from the diagnostics or another screen, is the appropriate firmware or operating system. The return frequency level check verifies the return frequency level on the set-top box 14.

If the set-top box 14 passes the diagnostic test, a key press test is performed. The key press test is designed to assess the functionality of the keys of the set-top box 14. Thus, a determination is made whether each key is pressed within a certain amount of time and if a predetermined timeout has expired, indicative of lack of detection of pressing of a key when it is known the key is being pressed, the test is terminated and it is considered as if the set-top box fails the key press test.

If the set-top box 14 passes the key press test, an analog video test, if applicable, is performed. The analog video test may include a video measurement test and a video quality test which assesses the quality of the video signal output from the set-top box. The analog video test may thus include a measurement of the video signal, which takes in a video pattern and checks the video output within expected values. The video quality test involves tuning to a certain number of pre-determined analog channels. The analog video test measurements can be performed by a digitizer included in the RLS tester 12.

If the set-top box 14 passes the analog video test, the RLS tester 12 then performs an AC or power outlet check test which is used to test the power outlet on the set-top box 14. The power outlet check test can be performed by including a Data Acquisition or switch unit in the RLS tester 12.

If the set-top box 14 passes the power outlet check test, a digital video quality test is performed. The digital video quality test may involve tuning to a certain number of pre-determined digital channels and assessing picture and audio output to acceptable performance criteria.

If the set-top box 14 passes the digital video quality test, an advanced video test, if applicable, (i.e. High-Definition channels) is performed.

If the set-top box 14 passes the advanced video test, a peripheral test is performed. The peripheral tests include testing of all of the various output connections and interfaces that the set-top box may have.

If the set-top box 14 passes the peripheral test, a return path test is performed. The return path test is an RF test for certain models of set-top boxes 14 and involves use of a spectrum analyzer. In view of the costs of a spectrum analyzer, it is envisioned that the return path test could also be accomplished via diagnostic menu screens via an OCR process.

If the set-top box 14 passes the return path test, a reset is done on the set-top box 14 and a determination made if the set-top box 14 passed the test platform. If so, any program purchases remaining in the set-top box 14 are flagged for the test operator to collect and clear from the set-top box 14 (or dependent on the content provider's preferences, can be automatically collected and cleared) and verified that they have been cleared, e.g., PPV programs, then turns off the set-top box 14 and the testing process has concluded. The set-top box 14 has been determined to be a NPF set-top box 14 which is ready for redeployment.

If the set-top box 14 fails any of the tests, a determination is made as to verify whether the failure is a true failure. The set-top box 14 is turned off and the testing process ends. The set-top box 14 status would be classified depending on the test failure. Thus, a set-top box 14 which fails the Unit ID test would be classified as one having a Security ID problem, which could be resolved at the warehouse at which the RLS tester 12 is situated or other testing facility.

For failing some tests, not only is a classification or repair code generated associated with the set-top box 14, but also a measured value would be logged and associated with the set-top box 14. The measured value would be the results of the particular test, and enables analysis of the extent of the deviation between permissible values and the measured value. Some tests which provide a measured value include the video measurement test and the audio measurement test.

Additional tests that can be performed by the RLS tester 12 include an intercarrier frequency measurement test which tests the intercarrier frequency of the set-top box 12.

Another test is a platform test which verifies the specific line of video. It requires input of a specific line of video and outputs a line of video.

Another set of tests include audio tests which can measure the audio signal output of the set-top box 14 (an audio measurement test) and test the functionality of the audio portion of the set-top box 14 (an audio functionality test). The audio measurement test looks at the measured value of a specifically tuned audio signal. It involves hardware in the RLS tester 12 and tunes the set-top box 14 to a specific channel for the measurement. The audio functionality test involves tuning the set-top box's mute and volume functions, as well as other audio related functions, and verifying the operability of these functions.

Reference is now made to FIGS. 4-15 wherein flow charts for some of the tests identified in FIG. 3 are set forth.

At the start of the testing process, an operator at the warehouse, or other testing site at which the RLS tester 12 is located, would first enter or scan in the serial number and Security ID and turn on the set-top box, referred to as a unit under test or UUT in FIGS. 4-15. It is determined whether the connection between the RLS tester 12 and the main server 16 is working, and then the Security ID is obtained from the content providers Incumbent Billing System 22 (IBS) and stored in memory. If the Security ID obtained from the set-top box 14 and the one obtained from the IBS 22, for the same serial number, are not identical, the test is terminated.

Otherwise, model information about the set-top box 14 is obtained and stored in memory. A retry counter is set to zero and the Security ID is again obtained from the set-top box 14 (see FIG. 5). If it is not identical to the Security ID obtained from the IBS 22, and the retry counter is one, the test is terminated. Otherwise, information about the set-top box 14 is again obtained from the set-top box 14 and compared again for failure confirmation.

If the Security ID's are identical, a network identification is obtained from the set-top box 14 and used to determine whether the set-top box 14 has been initialized. If the set-top box 14 has been initialized, the next test is commenced, otherwise the test is terminated and the set-top box 14 is considered as failing the initialization test.

Figure 6:
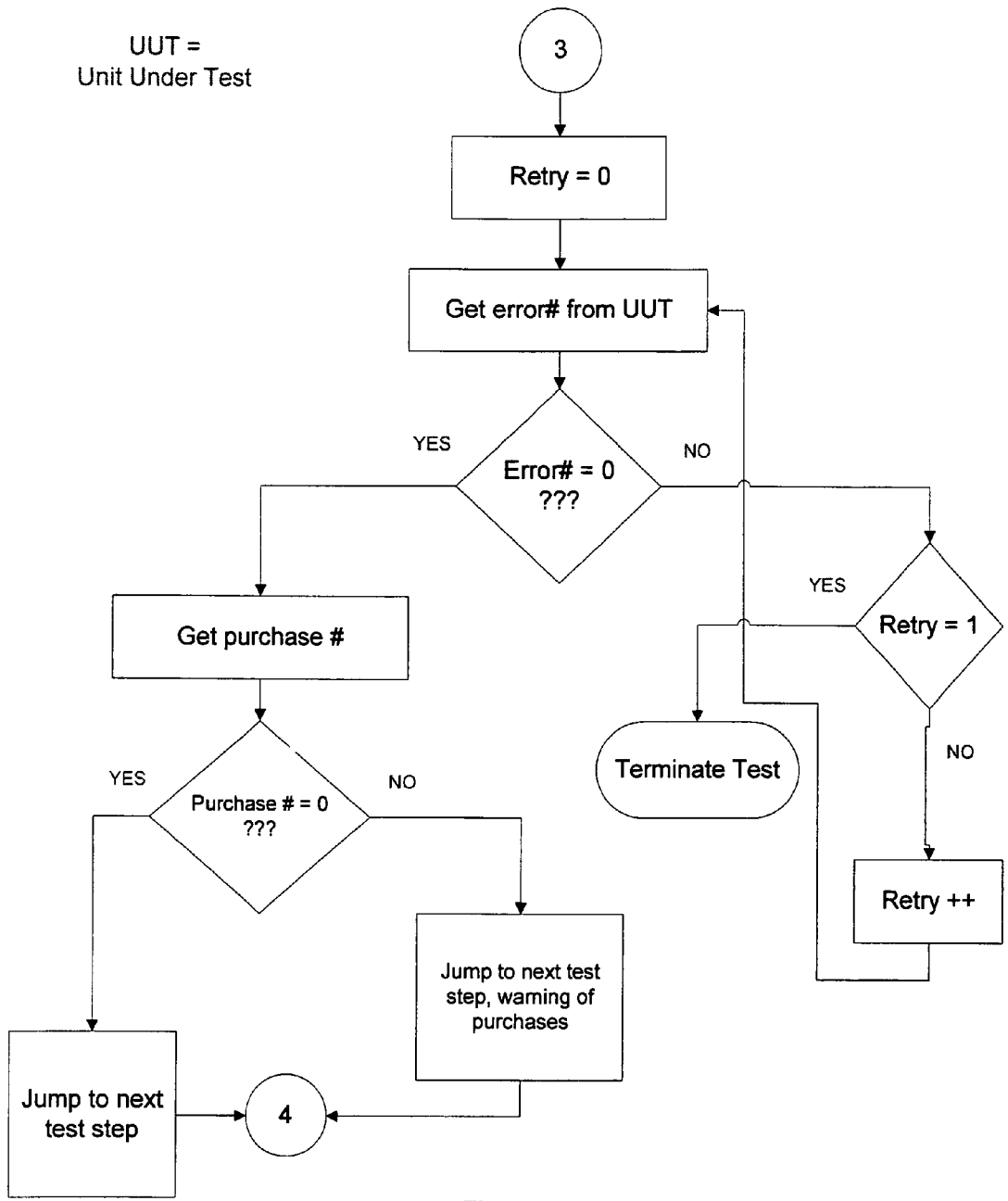

FIG. 6 shows an error code check which verifies whether the set-top box 14 has an error code of zero, with one retry possible, and a purchase check which verifies whether there are any pre-existing purchases remaining on the set-top box 14. If so, a warning is provided of such purchases in subsequent test stages. Both of these checks may be part of a diagnostic test.

Figure 7:
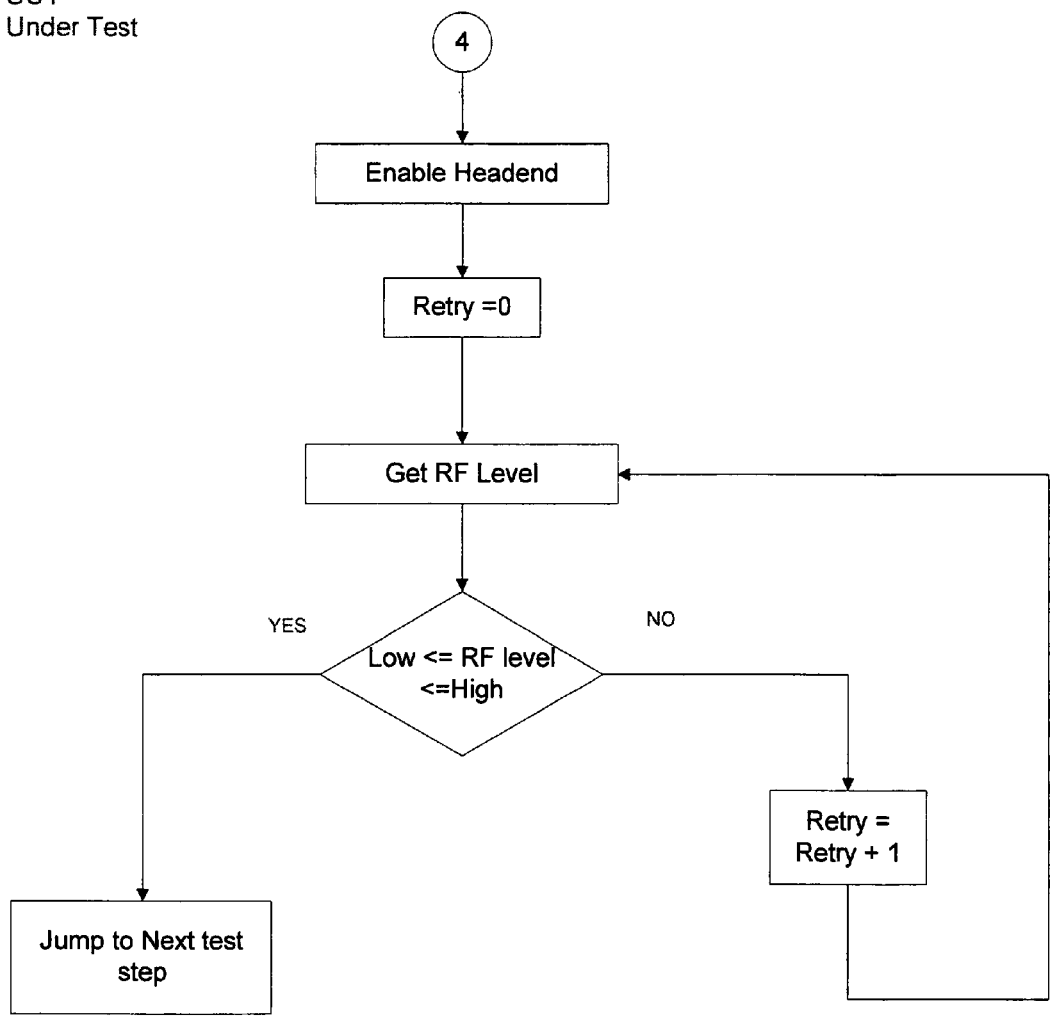

FIG. 7 shows as the next test after the error code check and the purchase check, an RF return level check which determines whether the RF level is between predetermined limits. There is one retry possibility.

Figure 8:
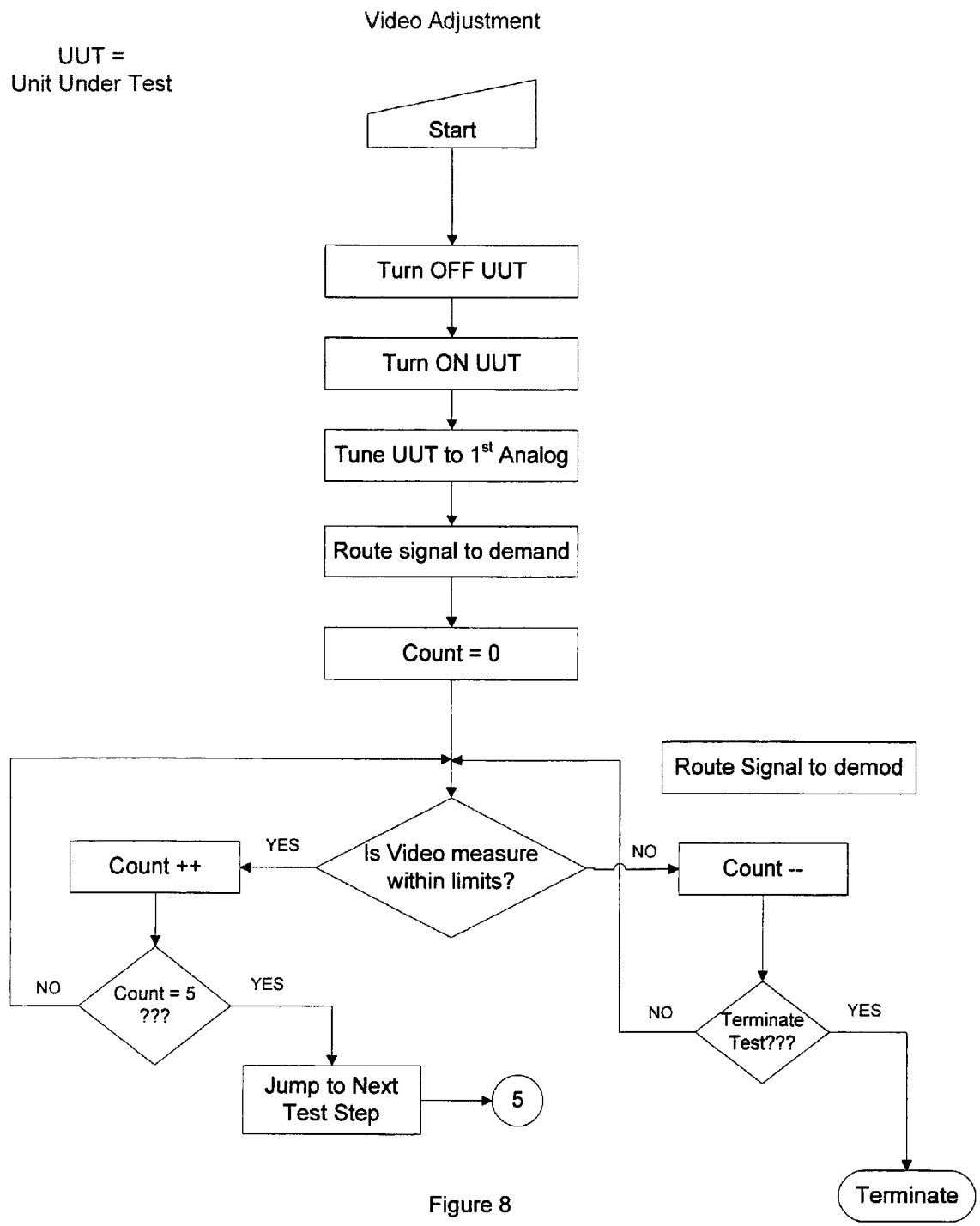

FIG. 8 shows a flow chart of a video test using the RLS tester 12 in accordance with the invention. For this test, the set-top box 14 is turned off and then on and tuned to a pre-determined channel. A signal generated by the RLS tester 12 is routed through a demodulator in the RLS tester 12 and a counter started at zero. A determination is made as to whether the video signal measurement is within predetermined limits with multiple attempts being made, until a maximum number set by a counter is reached. If the signal is within the predetermined limits, the set-top box 14 would pass this test.

Figure 10:
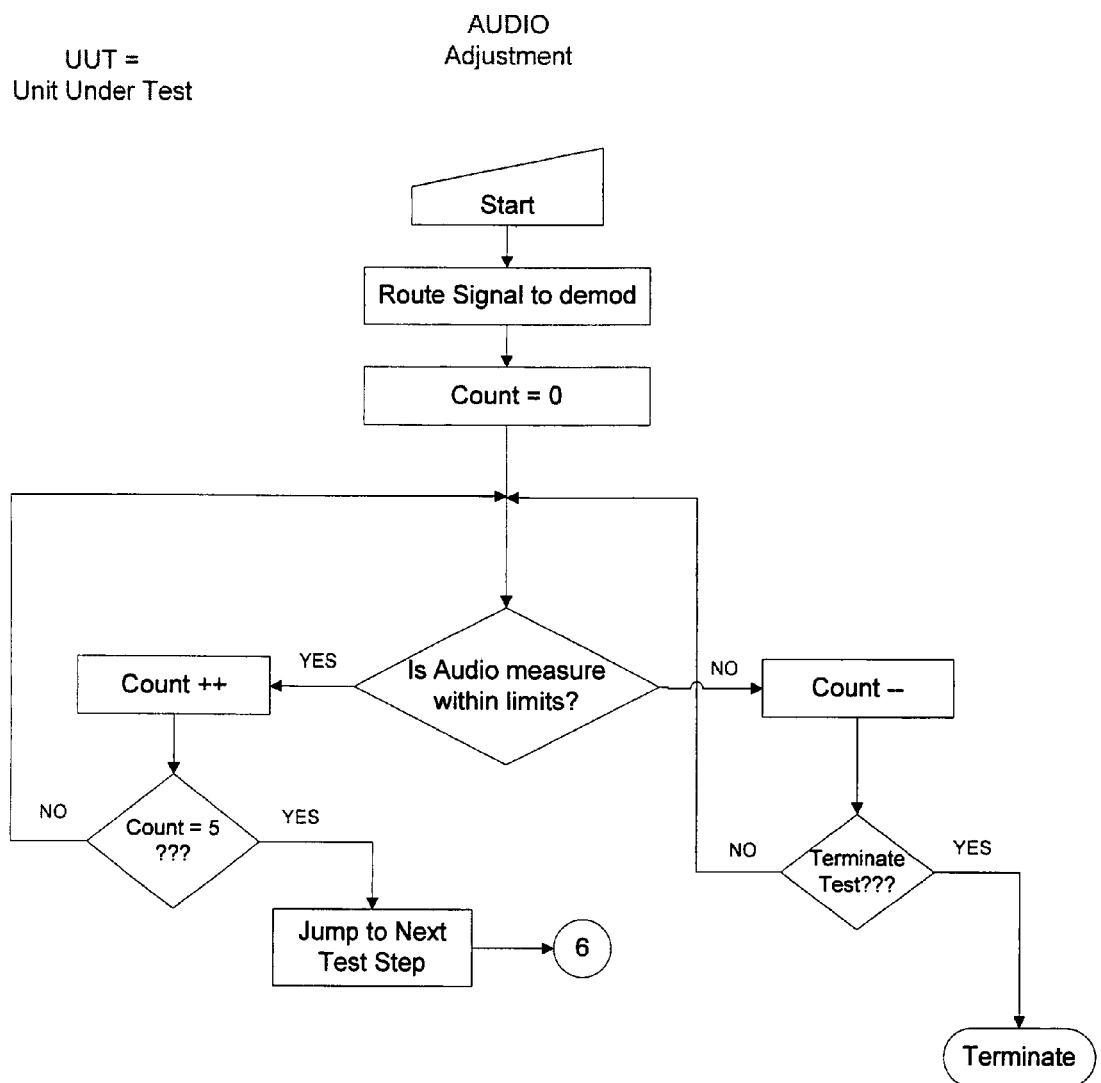

FIG. 10 shows a flow chart of an audio test using the RLS tester 12 in accordance with the invention. For this test, a signal generated by the RLS tester 12 is routed through a demodulator in RLS tester 12 and a counter started at zero. A determination is made as to whether the audio signal measurement is within predetermined limits with multiple attempts being made, until a maximum number set by a counter is reached. If the signal is within the predetermined limits, the set-top box 14 would pass this test.

Figure 9:
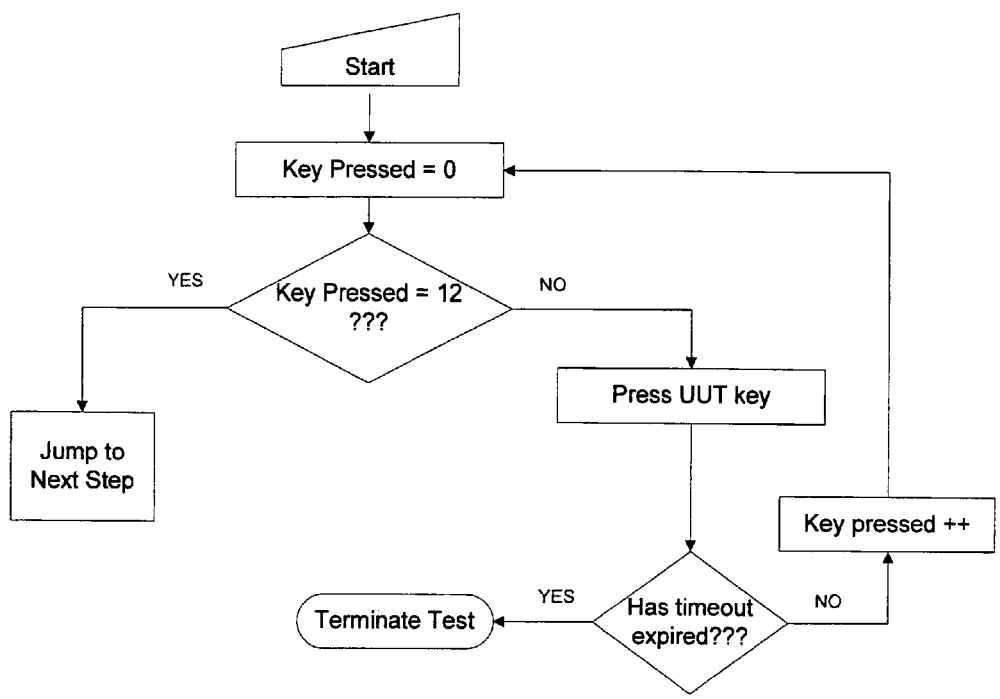

FIG. 9 shows a flow chart of the key press test wherein a determination is made whether each key is pressed within a certain amount of time and if a predetermined timeout has expired, indicative of lack of detection of pressing of a key when it is known the key is being pressed, the test is terminated and it is considered as if the set-top box 14 fails the key press test.

Figure 11:
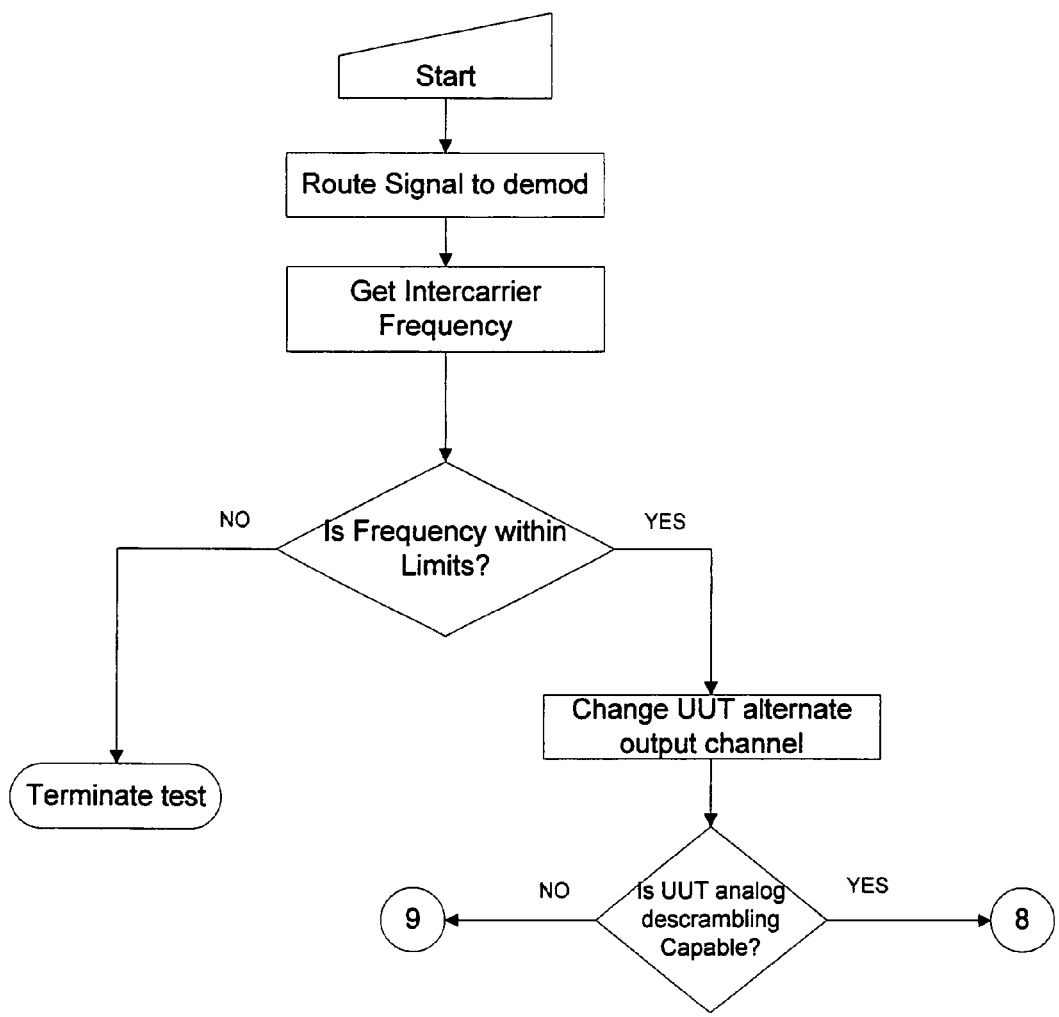

FIG. 11 shows a flow chart of the intercarrier frequency test wherein a signal is routed through a demodulator in RLS tester 12, and the intercarrier frequency is measured. A determination is made whether the obtained intercarrier frequency is within limits and if not, the test is terminated with an indication of the set-top box 14 failing the intercarrier frequency test. If the frequency is within limits, the channel of the set-top box 14 is changed to its alternate output channel and a determination is made whether the set-top box 14 is capable of scrambled analog channel reception. If the set-top box 14 is capable, the flow chart depicted in FIG. 12 is performed; if not, then the tests are not performed and testing continues as depicted in FIG. 13.

Figure 12:
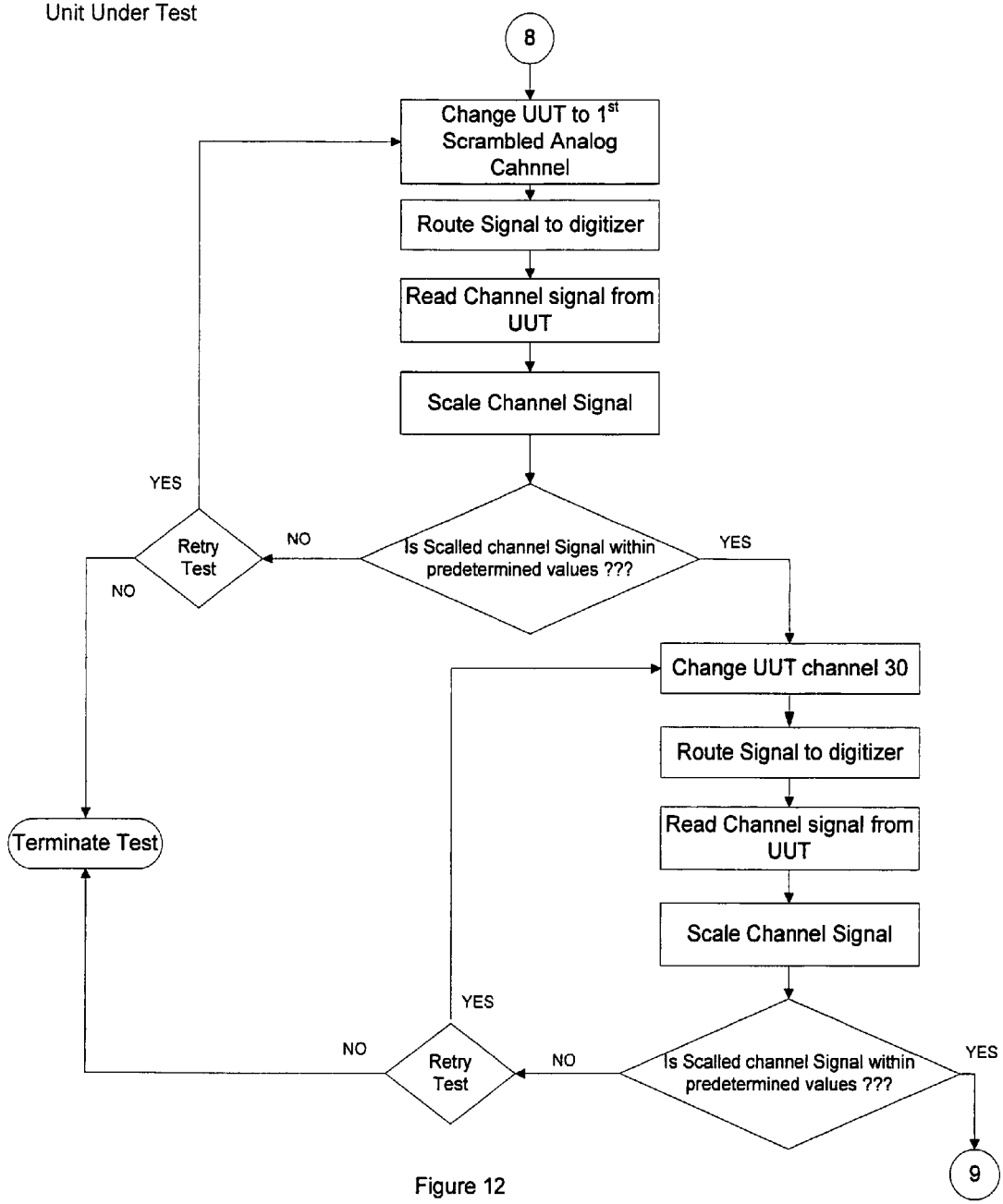

FIG. 12 shows a flow chart of the tests performed if the set-top box 14 is capable of processing scrambled analog signals. If the set-top box 14 is capable, the channel is changed to a pre-determined scrambled analog channel, a signal is routed to the digitizer of the RLS tester 12, a channel signal is read from the set-top box 14, the channel signal is scaled and then determined whether it is within predetermined values. If not, the test may be retried by repeating the steps above. If not retried, the test is terminated with an indication of failure of the analog descrambling test.

If the scaled channel signal is within predetermined values, the channel is changed to a different pre-determined scrambled analog channel, a signal is routed to the digitizer of the RLS tester 12, a channel signal is read from the set-top box 14, the channel signal is scaled and then determined whether it is within predetermined values. If not, the test may be retried by repeating the steps above. If not retried, the test is terminated with an indication of failure of the analog descrambling test.

Figure 13:
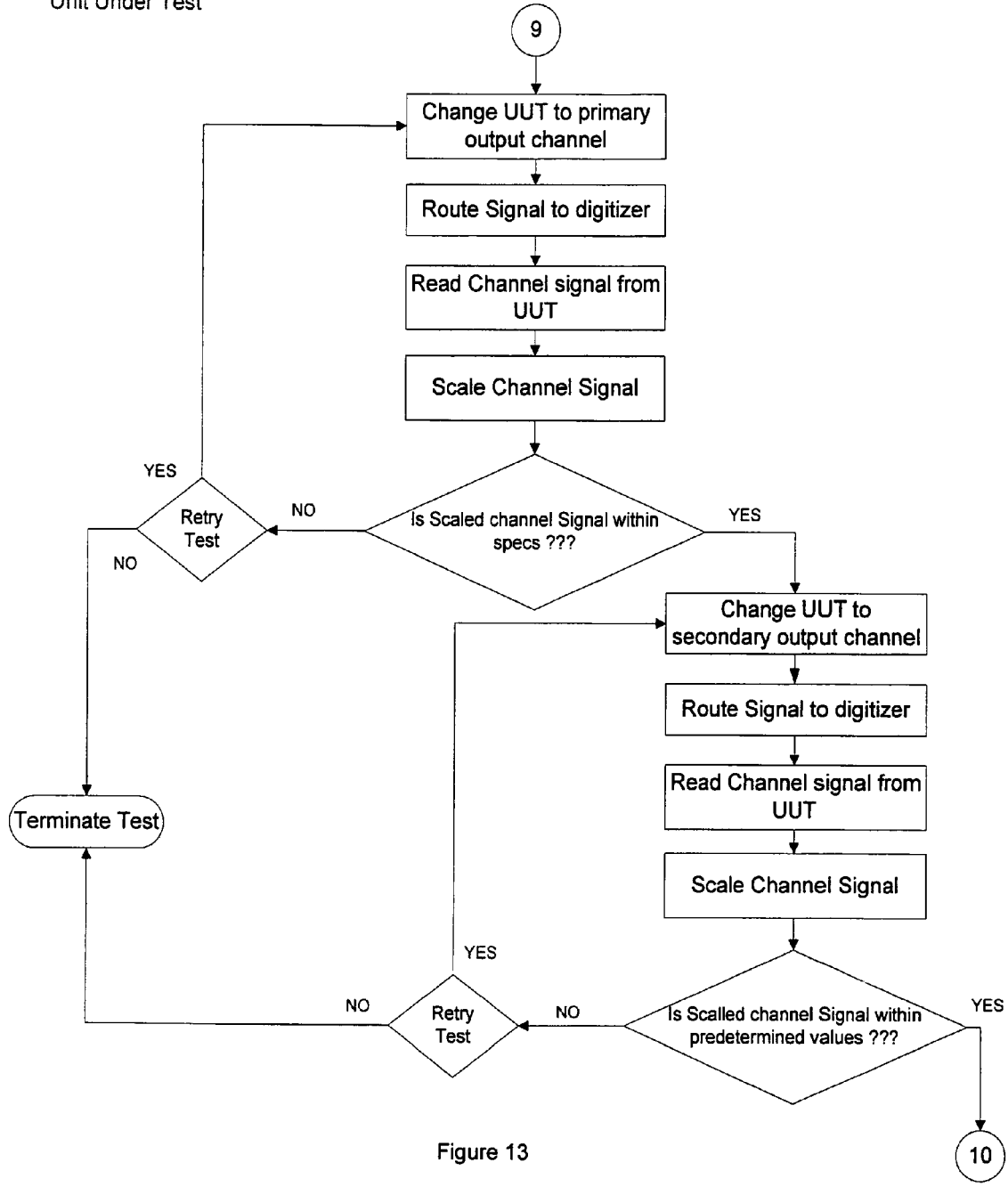

If the scaled channel signal is within predetermined values, the set-top box 14 output channel is changed back to its primary output channel, a signal is routed to the digitizer of the RLS tester 12, a channel signal is read from the set-top box 14, the channel signal is scaled and then determined whether it is within predetermined values (see FIG. 13). If not, the test may be retried by repeating the preceding steps again. If not retried, the test is terminated with an indication of failure of the analog reception test.

If the scaled channel signal is within predetermined specifications or values, the output channel of set-top box 14 is changed to its alternate output channel, a signal is routed to the digitizer of the RLS tester 12, a channel signal is read from the set-top box 14, the channel signal is scaled and then determined whether it is within predetermined values. If not, the test may be retried by repeating the preceding tests. If not retried, the test is terminated with an indication of failure of the analog reception test.

Figure 14:
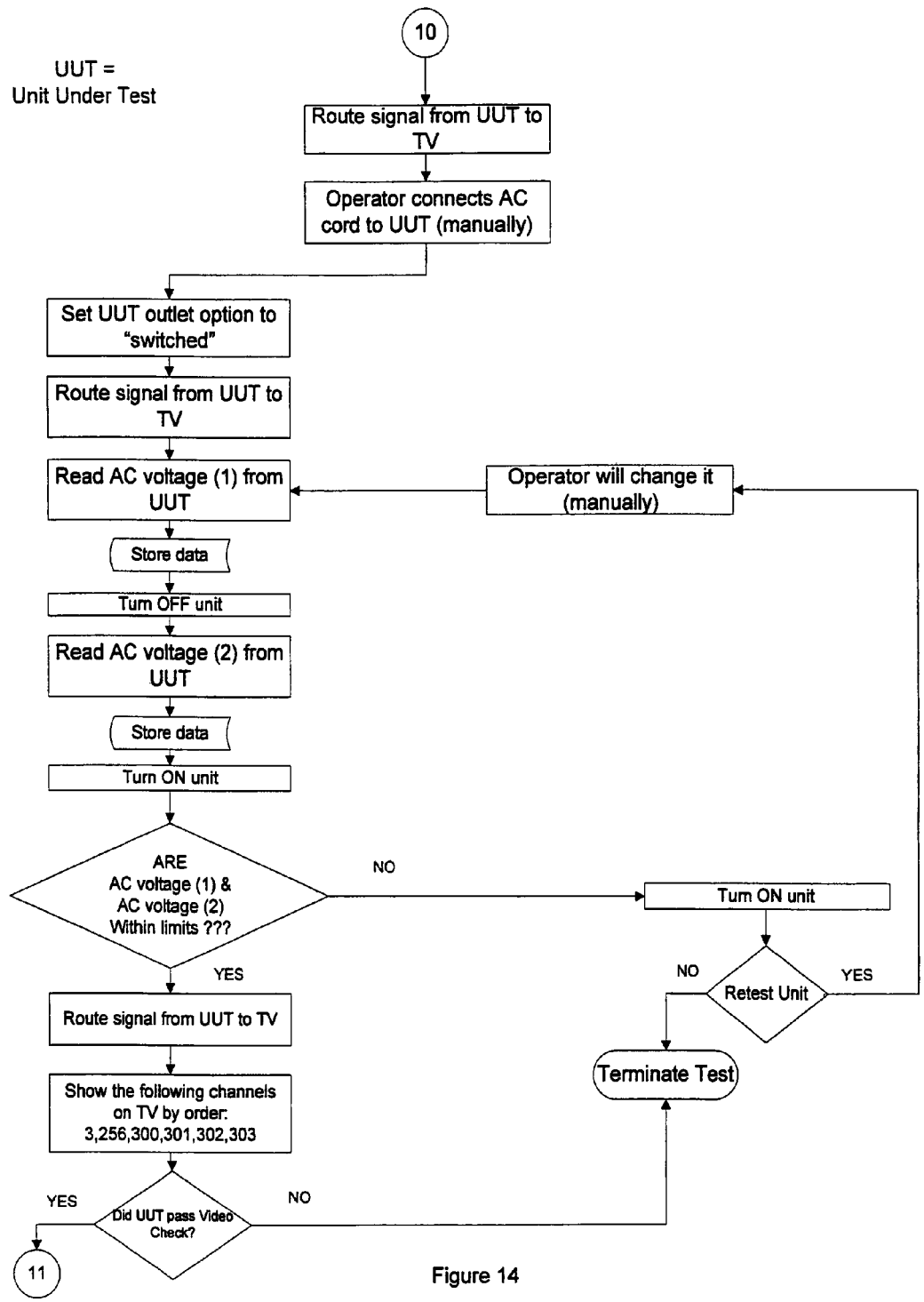

If the scaled channel signal is within predetermined specifications or values, a signal is routed from the set-top box 14 to the television through the RLS tester 12 (see FIG. 14). The test operator then connects an AC test cord to the AC outlet on set-top box 14 (if applicable) and a determination is made whether the set-top box channel changed to its setup screen. If not, the test operator changes it manually. Once the set-top box 4 has been changed to its setup screen, either manually or automatically, the set-top box 14 AC outlet option is set to "switched", a signal is routed from the set-top box 14 to the television, an AC voltage (1) is read from the set-top box 14. This data is stored, e.g., in a main database where the data about all of the set-top boxes 14 being tested by the RLS testers 12 is being stored. The set-top box 14 is then turned off, an AC voltage (2) is read from the set-top box 14 and stored.

The set-top box 14 is then turned on and a determination is made whether both voltages are within predetermined limits. If not, the set-top box 14 is turned on again and an opportunity is provided to retest the set-top box 14. If the set-top box 14 is to be re-tested, the AC outlet option is set to "switched" and the test proceeds as above. If the set-top box 14 is not re-tested, the test is terminated and an indication of failure the AC power outlet.

If both voltages are within predetermined limits, then a signal is routed from the set-top box 14 to the television, and channels are changed in a pre-determined sequence. It is noted that these channels and the order of any such channels can be varied as desired or needed. If the set-top box 14 does not pass the video check, the test is terminated with an indication being provided that the set-top box 14 failed the video test.

Figure 15:
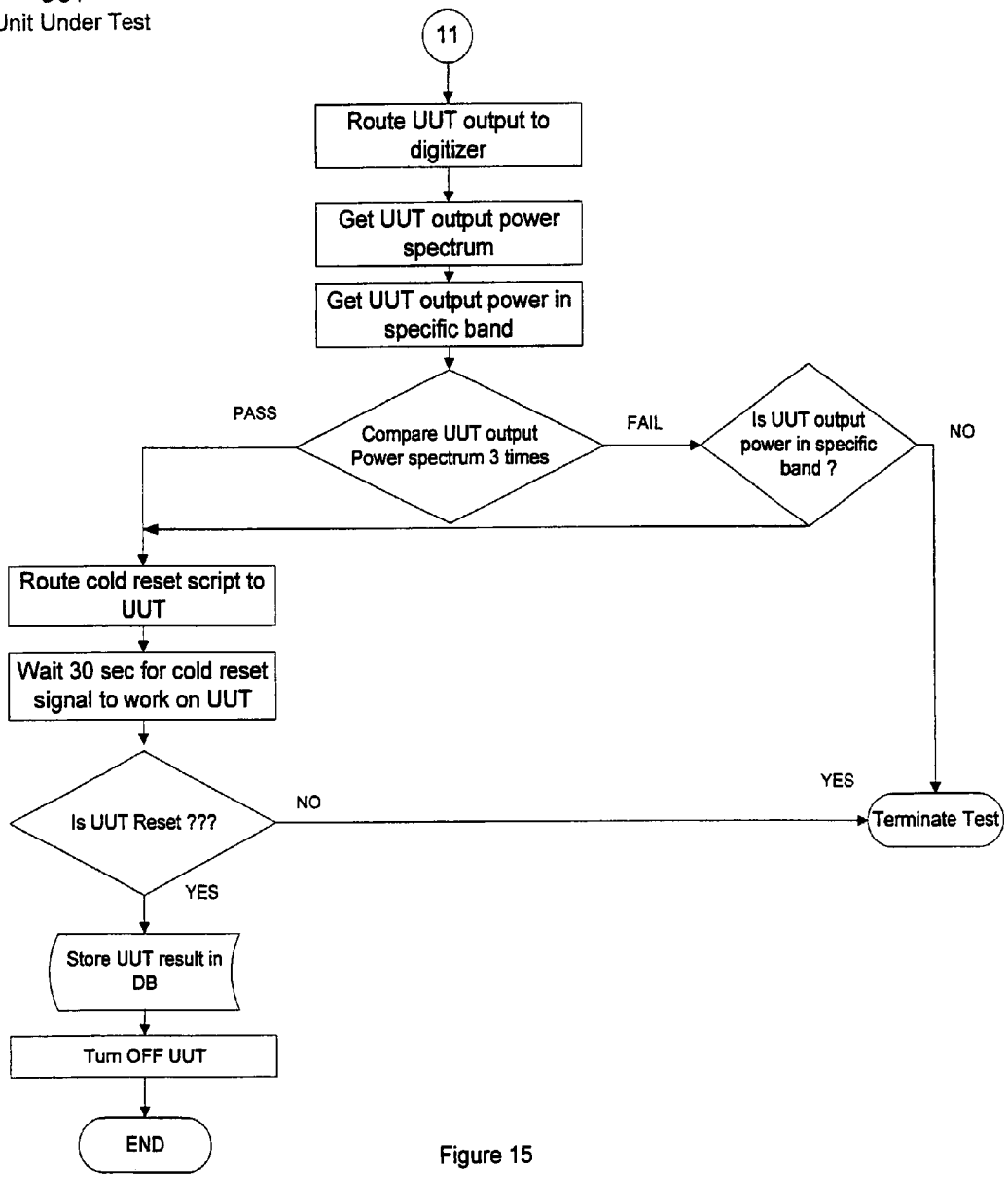

Otherwise, with reference to FIG. 15, a pre-determined signal is routed to the set-top box 14, the output from the set-top box 14 is sent to a digitizer, the output power is obtained from the set-top box 14 and more specifically, the output power in one or more specific bands is obtained from the set-top box 14.

The output power spectrum is compared a number of times, such as three times, and if they differ, a determination is made whether the output power in a specific band is greater than the pre-determined limits. If not, the test is terminated. If the output power in a specific band is greater than the pre-determined limits, or the set-top box power spectrum compares favorably, a reset signal is routed to the set-top box 14, a delay is incorporated, such as thirty seconds, for the reset signal to be received by the set-top box 14.

A determination is made whether the set-top box 14 is reset and if not, the test is terminated. If so, the test results are stored in a database. The set-top box 14 is turned off and the testing ends.

In the flow charts shown in FIGS. 4-15, whenever there is a retry possibility shown or even if a retry possibility is not shown, it is contemplated that any number of retry possibilities can be provided. Thus, at any stage where there is a determination made, this determination can be made two or more times to verify and validate unacceptable performance of the set-top box 14.

In order to perform the tests identified in FIG. 3 and/or described above, an RLS tester 12 in accordance with the invention should include hardware to enable the tests to be performed. This hardware, some of which is mentioned above, includes one or more televisions, monitors or other video output devices similar to devices to be used with the set-top boxes 14, connection members for connecting the RLS tester 12 to the televisions or other devices and to one or more set-top boxes 14, and a mounting frame or housing for mounting the televisions or other devices, RLS tester 12 and set-top boxes 14. Equipment, such as but not limited to, a data acquisition/switch, a digitizer, signal routing switches, IR blaster modules, interface boxes and demodulators are included in the RLS tester 12 to enable the testing described above.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. An arrangement for managing set-top boxes used by customers of a content service provider after the set-top boxes have been disconnected by the customers from their equipment, returned by the customers to the content service provider such that the set-top boxes are no longer in possession of the customers, and moved to a common testing facility maintained by the content service provider, comprising:

at least one automated tester each arranged to couple to at least one set-top box, after having been returned by a customer to the content service provider and moved to the common testing facility, and subject each set-top box, when coupled to said at least one automated tester and not to the customer's equipment, to a series of automated tests to determine whether each set-top box is functioning properly or requires subsequent repair, said at least one automated tester being arranged to categorize each tested set-top box into one of a plurality of different categories, the categories including one in acceptable working order, one having a problem that can be resolved at the testing facility and one having a problem that requires subsequent shipment to a repair facility; and a processor unit coupled to said at least one automated tester for receiving test results from said at least one automated tester and monitoring testing of set-top boxes via said at least one automated tester, said processor unit being arranged to:

coordinate shipment of the set-top boxes, after having been returned by customers to the content service provider, moved to the common testing facility and categorized as having a problem that requires shipment to the repair facility by the at least one automated tester, by the content service provider from the testing facility, at which the set-top boxes have been categorized as having a problem that requires shipment to the repair facility by the at least one automated tester, to the repair facility, repair of these set-top boxes at the repair facility, and return of repaired set-top boxes to the testing facility, whereby said at least one automated tester is located at the testing facility maintained by the content service provider and the testing facility is situated separate and apart from locations at which the customers use the set-top boxes with their equipment such that categorization of each tested set-top box is performed separate and apart from the locations at which the customers use the set-top boxes, and whereby each set-top box categorized as being in acceptable working order being redeployable, each set-top box categorized as having a problem that can be resolved at the testing facility is corrected at the site of said at least one automated tester, each set-top box categorized as having a problem requiring subsequent shipment to a repair facility is shipped to the repair facility.

2. The arrangement of claim 1, wherein said at least one automated tester comprises a plurality of automated testers all of which are situated at the testing facility, said processor unit being coupled to said plurality of automated testers.

3. The arrangement of claim 1, further comprising a database coupled to said processor unit for storing the test results from said at least one automated tester.

4. The arrangement of claim 1, further comprising a billing system coupled to said at least one automated tester and to said processor unit and arranged to coordinate invoicing for testing performed by said at least one automated tester and repair of set-top boxes.

5. The arrangement of claim 1, wherein said processor unit includes computer programs for performing a plurality of diagnostic tests on each set-top box, when coupled to said at least one automated tester and not to the customer's equipment, and providing an indication of failure of a specific one of the diagnostic tests.

6. The arrangement of claim 1, wherein said at least one automated tester includes at least one optical scanner for scanning a screen of a video output device, and a computer program for recognizing optical characters on the screen and analyzing the recognized optical characters, each set-top box being coupled to said at least one automated tester in a manner in which it generates output on the screen.

7. The arrangement of claim 1, wherein said processor unit is arranged to keep each set-top box determined to be functioning properly at the testing facility for redeployment to customers.

8. The arrangement of claim 1, wherein said at least one automated tester subjects each set-top box to the series of tests, when coupled to said at least one automated tester and not to the customer's equipment, by providing signals to each set-top box to affect the operation of at least one component of the set-top box, generating an operational parameter of the set-top box while the set-top box is receiving the signals from said at least one automated tester and then analyzing the operational parameter to determine whether the set-top box is functioning properly or requires repair.

9. The arrangement of claim 3, further comprising interface means for enabling access to said database and generation of customized reports about the set-top boxes tested by said at least one automated tester.

10. The arrangement of claim 8, wherein said at least one automated tester includes at least one optical scanner for scanning a screen of a video output device, and a computer program for recognizing optical characters on the screen and analyzing the recognized optical characters, said at least one automated tester being arranged to, in one of the series of tests, provide signals to each set-top box to cause the set-top box to generate a display on the screen of the video output device when the video output device is coupled to and receiving output from the set-top box, said processor being arranged to compare recognized optical characters provided by said computer program to expected optical characters to determine whether a display component of the set-top box is functioning properly or requires repair.

11. An arrangement for managing set-top boxes used by customers of a content service provider after the set-top boxes have been disconnected by the customers from their equipment, returned by the customers to the content service provider such that the set-top boxes are no longer in possession of the customers, and moved to a common testing facility maintained by the content service provider, comprising:
testing means for testing set-top boxes after having been returned by a customer to the content service provider and moved to the common testing facility, said testing means being arranged to subject each set-top box, when coupled to said testing means and not to the customer's equipment, to a series of automated tests to determine whether each set-top box is functioning properly or requires repair, said testing means being arranged to categorize each tested set-top box into one of a plurality of different categories, the categories including one in acceptable working order, one having a problem that can be resolved at the testing facility and one having a problem that requires subsequent shipment to a repair facility; and
processor means coupled to said testing means for receiving test results about set-top boxes from said testing means and coordinating subsequent repair of set-top boxes determined to require repair, said processor means being arranged to:
coordinate shipment of the set-top boxes, after having been returned by customers to the content service provider, moved to the common testing facility and categorized as having a problem that requires shipment to the repair facility by said testing means, by the content service provider from the testing facility, at which the set-top boxes have been categorized as having a problem that requires shipment to the repair facility by said testing means, to the repair facility,
repair of these set-top boxes at the repair facility, and
return of repaired set-top boxes to the testing facility,
whereby said testing means is located at the testing facility maintained by the content service provider and the testing facility is situated separate and apart from locations at which the customers use the set-top boxes with their equipment such that categorization of each tested set-top box is performed separate and apart from the locations at which the customers use the set-top boxes, and
whereby
each set-top box categorized as being in acceptable working order being redeployable,
each set-top box categorized as having a problem that can be resolved at the testing facility is corrected at the site of said at least one automated tester,
each set-top box categorized as having a problem requiring subsequent shipment to a repair facility is shipped to the repair facility.

12. The arrangement of claim 11, further comprising billing means coupled to said processor means for coordinating invoicing for testing performed by said testing means and repair of set-top boxes.

13. The arrangement of claim 11, further comprising data storage means for storing test results from said testing means, said data storage means being accessible to enable generation of customized reports about operability of the set-top boxes.

14. The arrangement of claim 11, wherein said testing means subject each set-top box to the series of tests, when coupled to said testing means and not to the customer's equipment, by providing signals to each set-top box to affect the operation of at least one component of the set-top box, generating an operational parameter of the set-top box while the set-top box is receiving the signals from said testing means and then analyzing the operational parameter to determine whether the set-top box is functioning properly or requires repair.

15. A method for managing set-top boxes used by customers of a content service provider after the set-top boxes have been disconnected by the customers from their equipment and returned by the customers to the content service provider such that the set-top boxes are no longer in possession of the customers, comprising:
directing customers to return set-top boxes to the content service provider;
receiving set-top boxes at a common testing facility after the set-top boxes have been disconnected by the customers from their equipment and returned by the customers to the content service provider including any set-top boxes indicated by customers as malfunctioning, the testing facility being situated separate and apart from locations at which the customers use the set-top boxes with their equipment;
after the set-top boxes have been returned by customers to the content service provider and received at the testing facility, coupling each set-top box to an automated tester located at the testing facility; then
subjecting each set-top box, when coupled to the automated tester, to a series of automated tests by means of the automated tester to identify whether each set-top box is in acceptable working order, has a problem that can be resolved at the testing facility or has a problem that requires subsequent shipment to a repair facility separate from the testing facility, whereby the automated tester categorizes each tested set-top box into one of a plurality of different categories, the categories including one in acceptable working order, one having a problem that can be resolved at the testing facility and one having a problem that requires subsequent shipment to the repair facility;

redeploying each set-top box categorized as being in acceptable working order without shipping the set-top box to the repair facility;

resolving the problem with each set-top box categorized as having a problem that can be resolved at the testing facility without shipping the set-top box to the repair facility;

shipping set-top boxes, after having been returned by customers to the content service provider, received at the common testing facility and categorized as having a problem that requires shipment to the repair facility, from the testing facility to the repair facility, the shipping of set-top boxes by the content service provider from the testing facility to the repair facility being coordinated by a processor, and coordinating return of each set-top box, that had a problem requiring shipment to the repair facility for repair and that was shipped to the repair facility, from the repair facility to the testing facility.

16. The method of claim 15, wherein the testing facility at which the set-top boxes indicated by customers as malfunctioning are received is a warehouse maintained by the content service provider, further comprising storing each set-top box categorized as being in acceptable working order at the warehouse for subsequent redeployment.

17. The method of claim 15, wherein the automated tests include a test for checking a Security ID and serial number of the set-top box, a problem with correspondence between a Security ID or serial number obtained from the set-top box and a Security ID or serial number provided to the automated tester being a problem resolvable at the testing facility.

18. The method of claim 15, further comprising notifying the repair facility when a set-top box is categorized as having a problem requiring shipment to the repair facility to enable the repair facility to order parts for repairing the set-top box in advance of receipt of said failed set-top box by the repair facility.

19. The method of claim 15, further comprising:
storing information derived from the automated tests; and
providing means to access and analyze the stored information and enable generation of customized reports about the operability of set-top boxes.

20. The method of claim 15, further comprising linking the repair facility and the testing facility via at least one network.

21. The method of claim 15, wherein the step of subjecting each set-top box to a series of automated tests by means of the automated tester comprises:
identifying the model and make of the set-top box, and
running a set of automated diagnostic tests specific to the determined model and make of the set-top box.

22. The method of claim 15, further comprising:
monitoring the testing to which the set-top boxes are subjected;
monitoring the repair of the set-top boxes; and
coordinating billing for testing and repair of the set-top boxes via a billing system linked to the testing facility and the repair facility.

23. The method of claim 15, further comprising:
providing a plurality of automated testers at the testing facility; and
coupling the plurality of automated testers to a single control processor which receives test results from all of the automated testers.

24. The method of claim 15, wherein the step of subjecting each set-top box to a series of automated tests by means of the automated tester comprises providing signals to each set-top box to affect the operation of at least one component of the set-top box, generating an operational parameter of the set-top box while the set-top box is receiving the signals from the automated tester and then analyzing the operational parameter to determine whether the set-top box is functioning properly or requires repair.

25. The method of claim 18, further comprising coordinating delivery of parts for repairing the set-top box to delivery of the set-top box at the repair facility.

* * * * *